May 19, 1931.  S. W. TREAT  1,805,791
BOX STRAPPING MACHINE
Filed Aug. 30, 1926  12 Sheets-Sheet 1
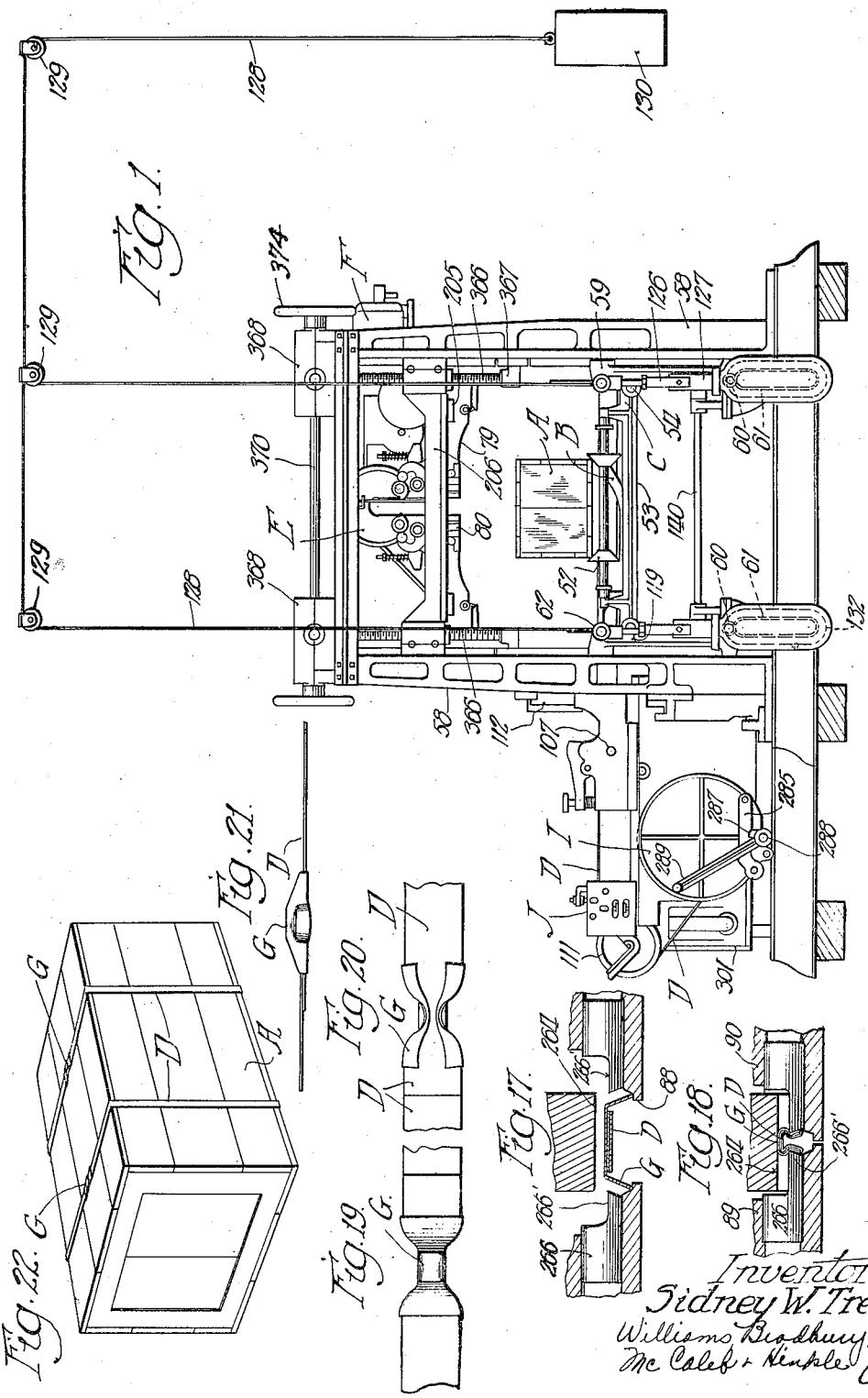

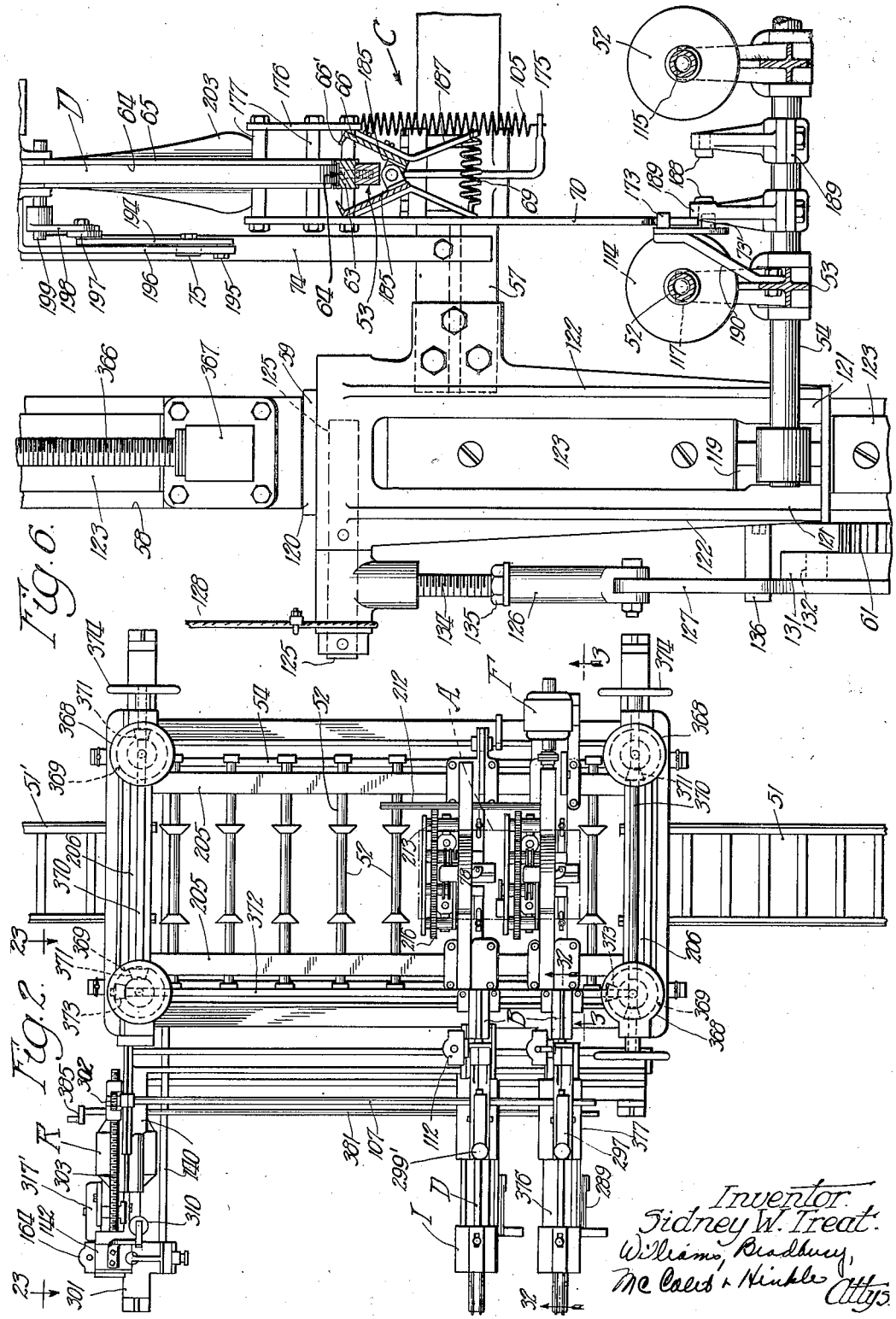

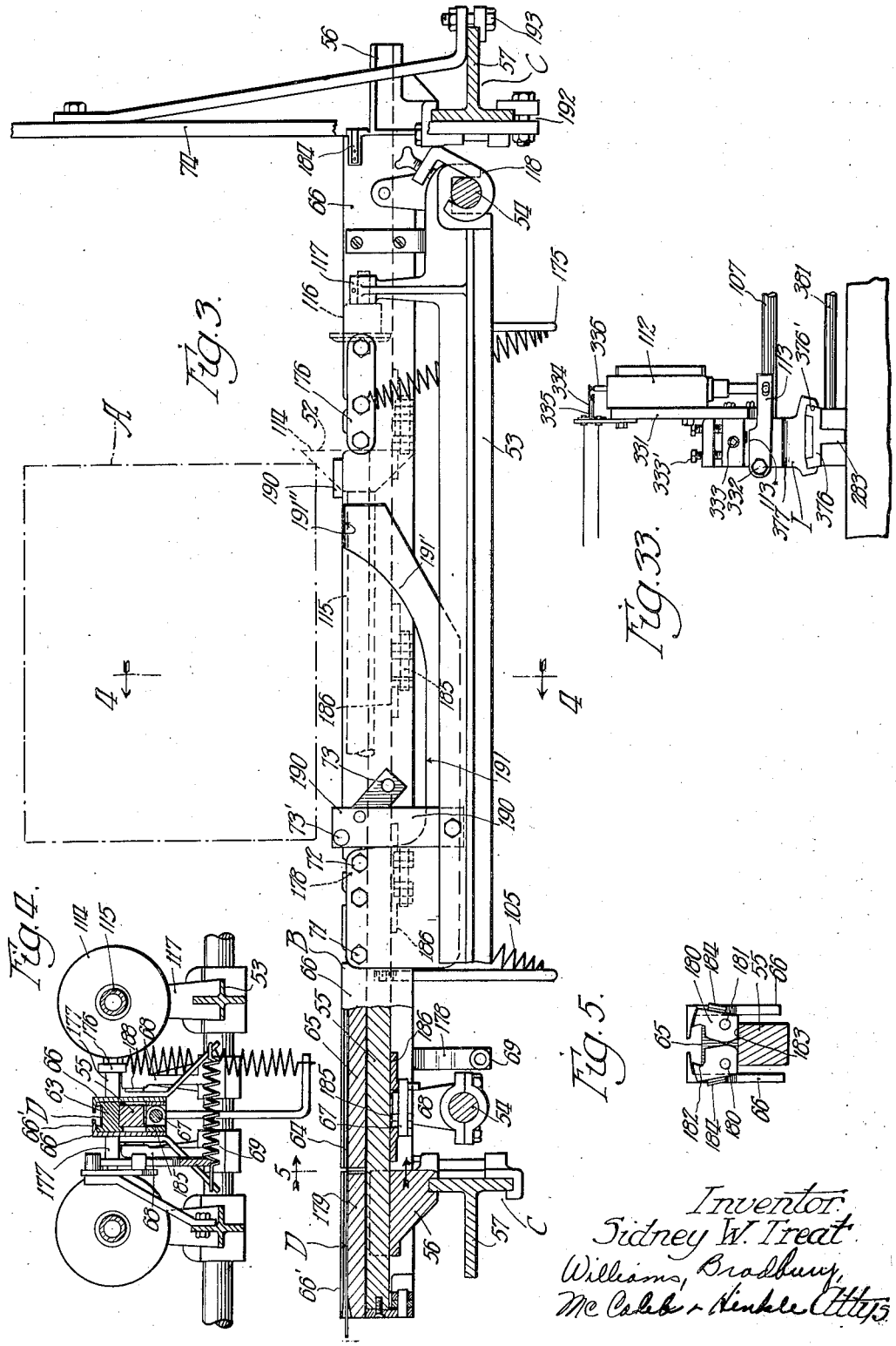

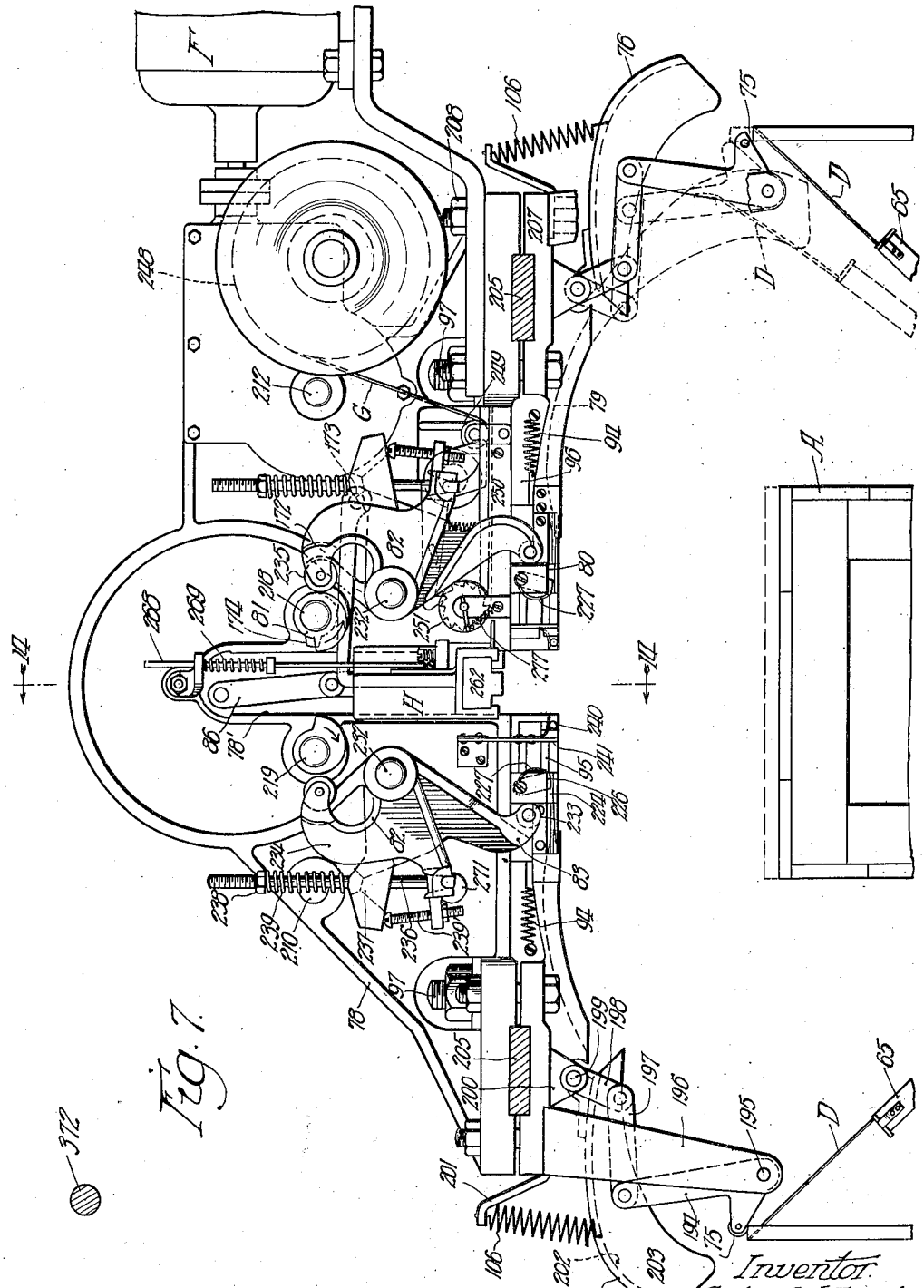

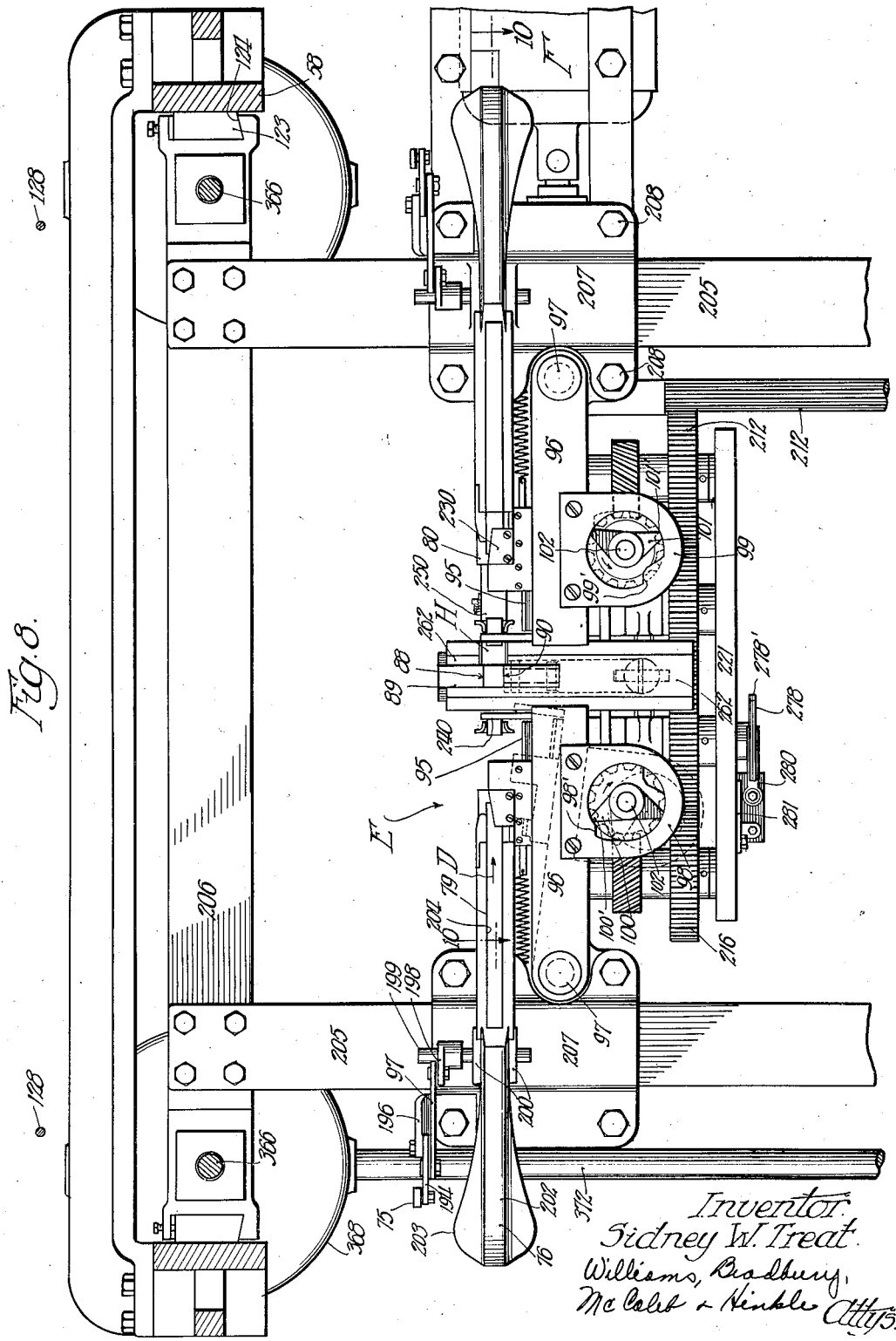

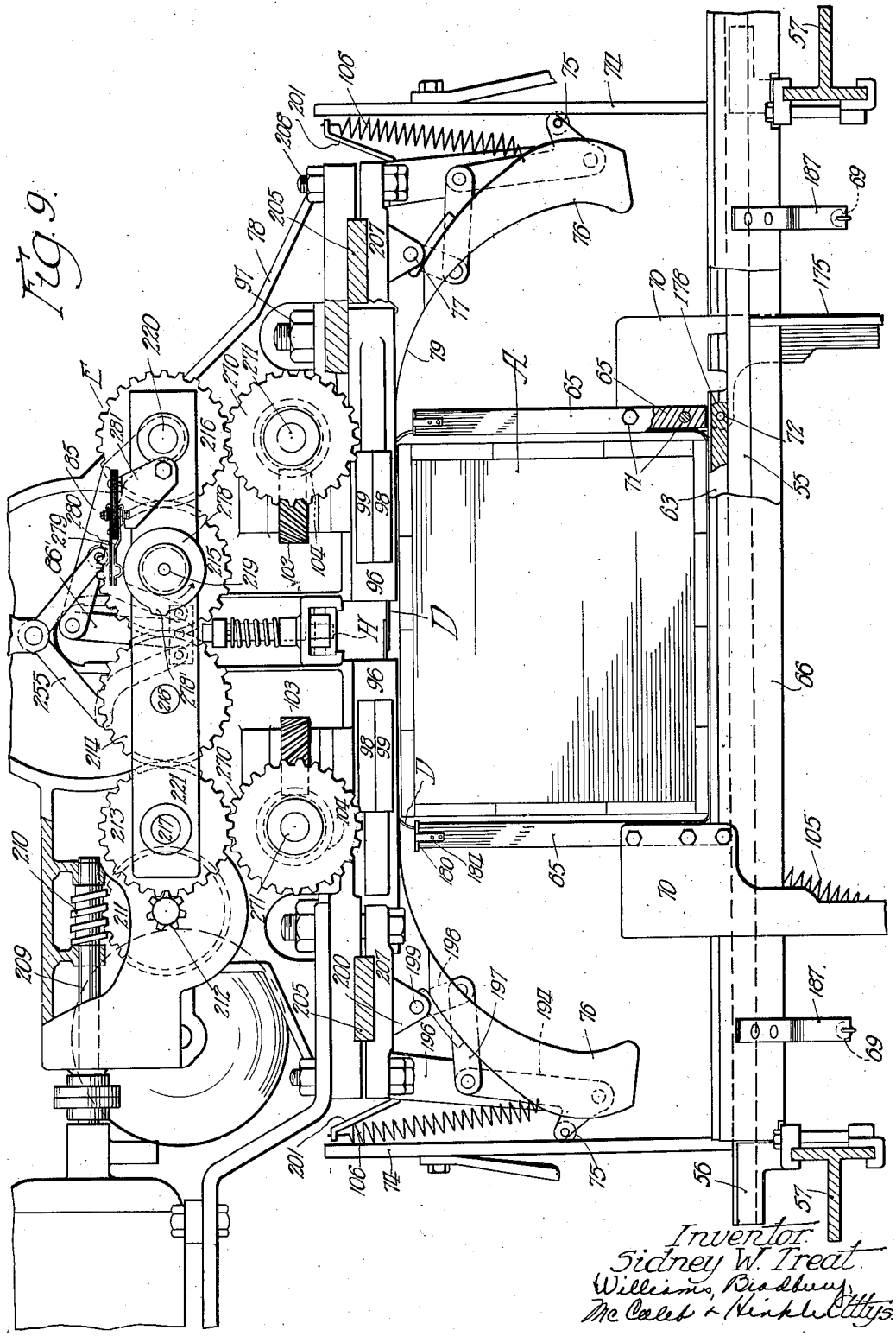

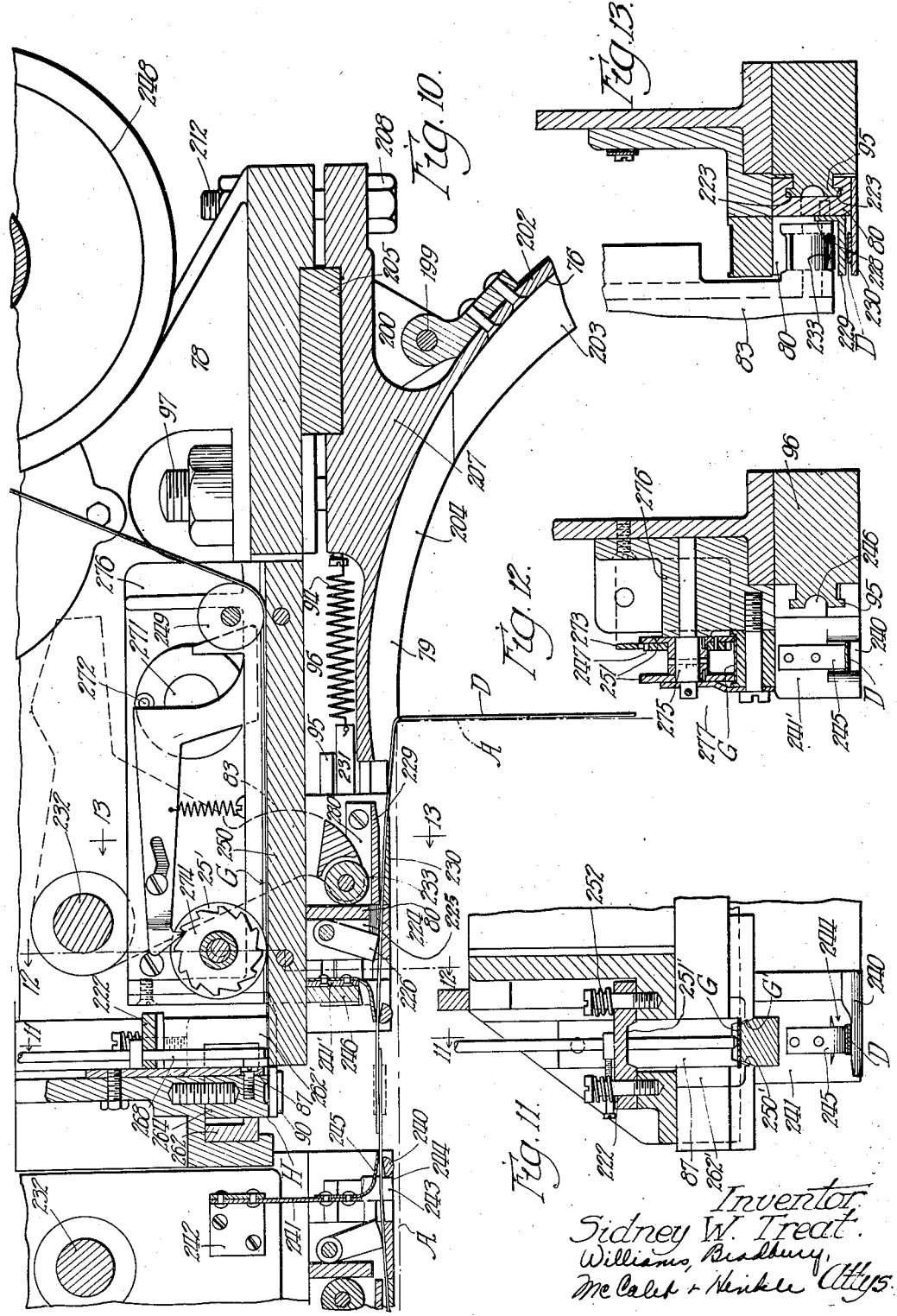

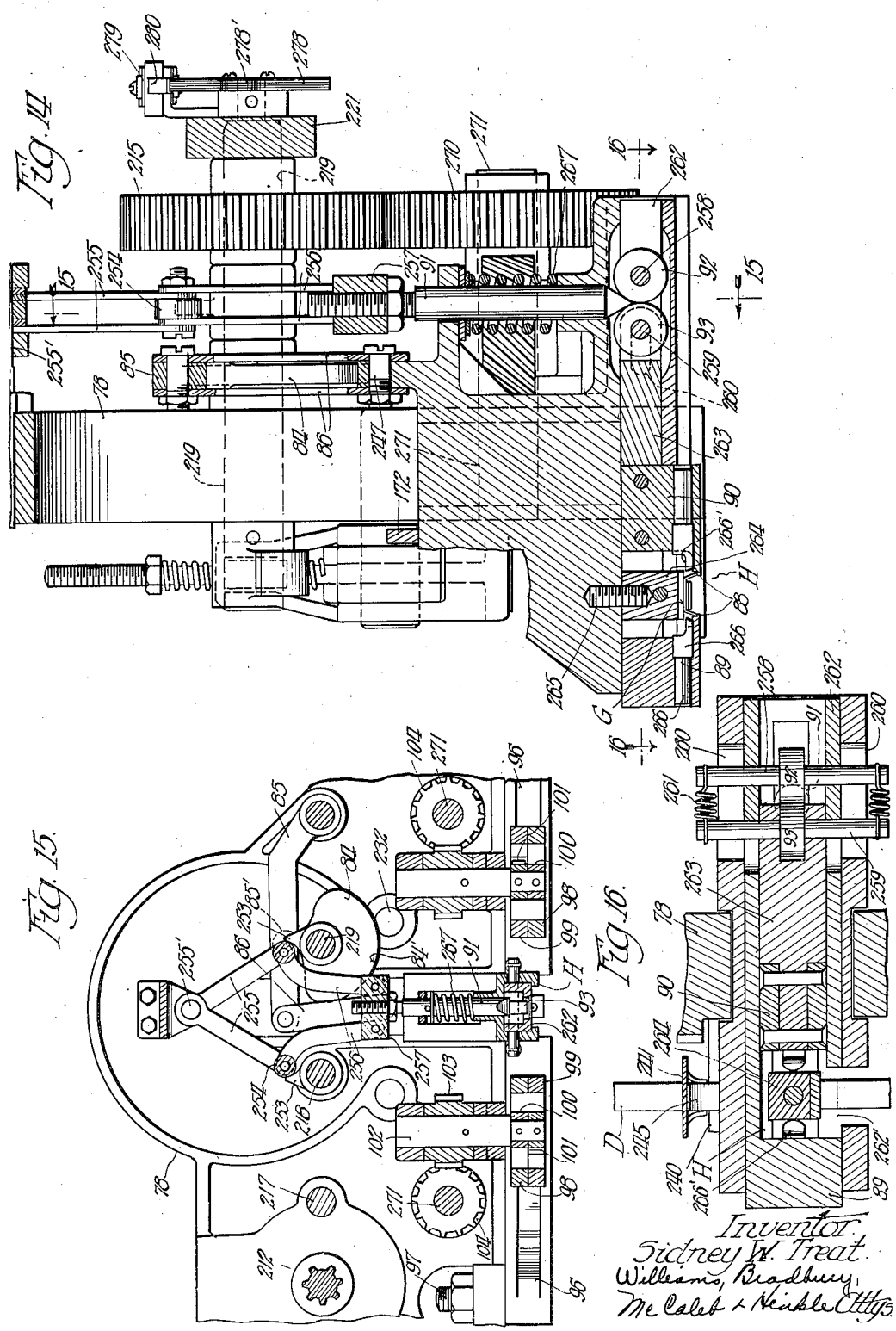

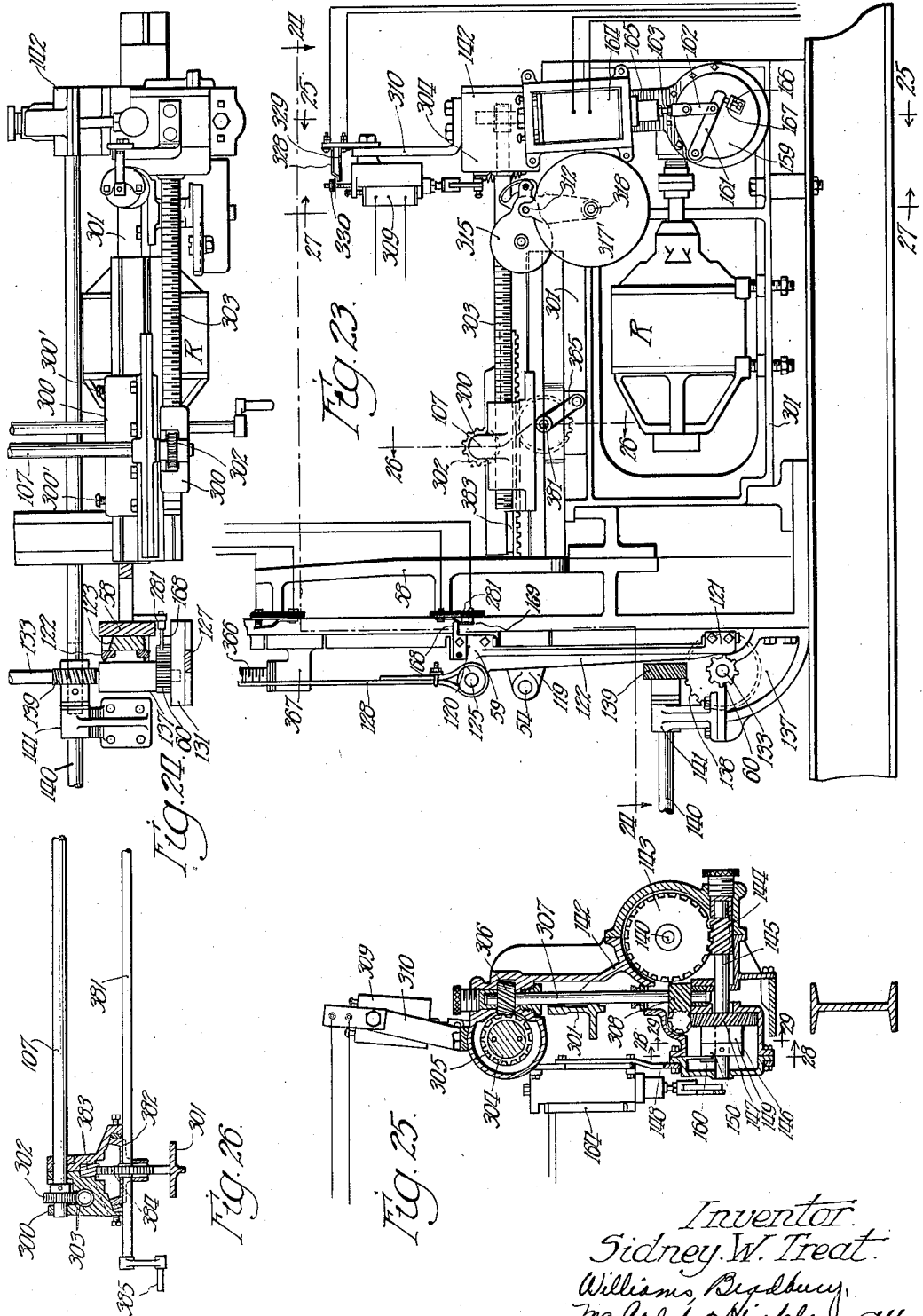

May 19, 1931. S. W. TREAT 1,805,791
BOX STRAPPING MACHINE
Filed Aug. 30, 1926 12 Sheets-Sheet 10
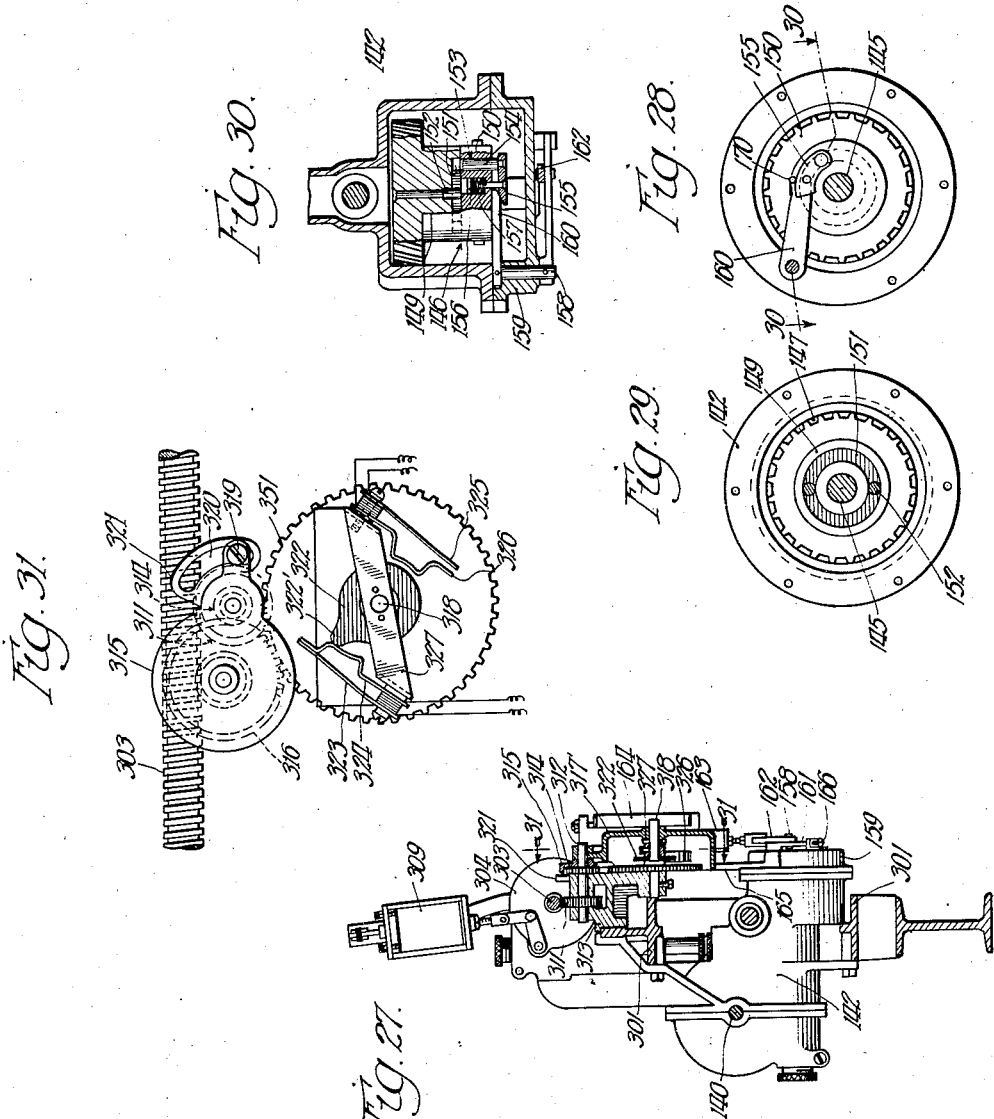

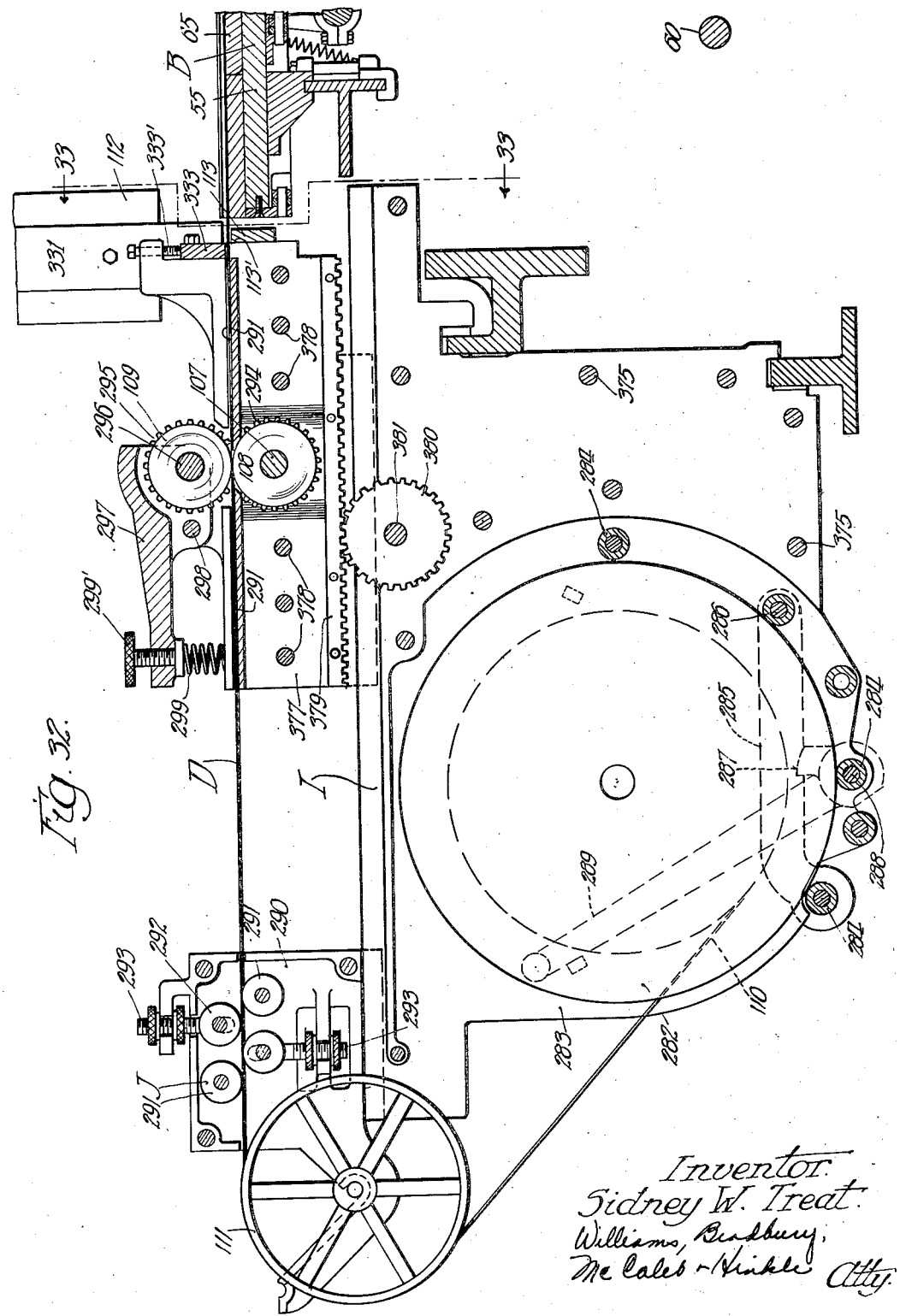

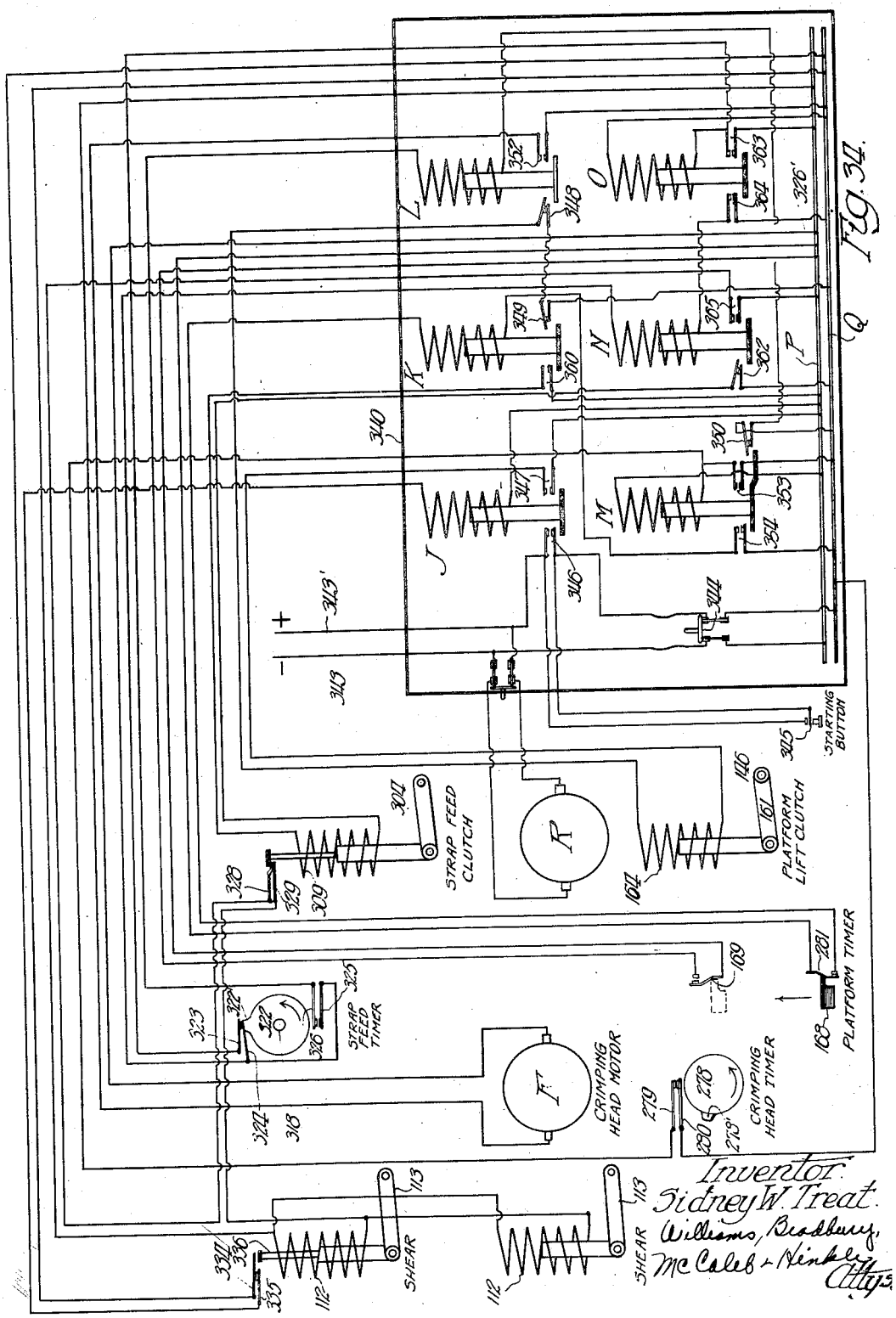

Patented May 19, 1931

1,805,791

UNITED STATES PATENT OFFICE

SIDNEY W. TREAT, OF CHICAGO, ILLINOIS, ASSIGNOR, BY MESNE ASSIGNMENTS, TO SIGNODE STEEL STRAPPING COMPANY, A CORPORATION OF DELAWARE

BOX STRAPPING MACHINE

Application filed August 30, 1926. Serial No. 132,410.

This invention relates to box strapping machines, its general object being the provision of a machine of simple and economical construction and efficient operation, which will place binder strapping tightly about a box, package, or other object, and secure the ends of the strapping together in a tension-resisting joint.

Many other objects and advantages of the invention are to be found from the description to follow. The invention here disclosed may be considered an improvement upon the invention described and claimed in Patent No. 1,499,454, issued to Arthur G. G. Guenther.

In general, the machine comprises a support upon which a box or package is placed, a wrapping mechanism which carries a suitable length of strapping and folds it about the box, and jaws for crimping the lapped ends of the straps. The wrapping mechanism, together with the box, is raised to a point where the ends of the strap are grasped by stretching jaws which stretch the strap tightly about the box and bring the ends of the strap into overlapping relation, subsequent to which a reenforcing girth is applied to the overlapping ends, and the girth and the strap ends are then crimped together into a tension-resisting deformation. As the box then descends, the wrapping mechanism is unfolded to its original position, whence the box can be trundled off the machine. As will be noted later, a plurality of straps are placed about the box simultaneously. The tension-resisting deformation of the binder strapping here shown is of the general type first described and claimed in Patent No. 1,038,108 issued September 10, 1912, to Ellsworth E. Flora, and of the particular type described and claimed by him in Patent No. 1,252,680 issued January 8, 1918.

A clearer understanding of the invention will be had by referring now to a specific embodiment as disclosed in the accompanying drawings, in which Figure 1 is a front end elevation of the machine;

Figure 2 is a plan view;

Figure 3 is a front view, partly in elevation and partly in section, of one of the wrapping mechanisms taken substantially on line 3—3 of Figure 2;

Figure 4 is a transverse section of the strap folding mechanism taken on line 4—4 of Figure 3;

Figure 5 is an end elevation of one of the folding arms of the wrapping mechanism taken on line 5—5 of Figure 3;

Figure 6 (Sheet 2) is a transverse section of a wrapping mechanism, somewhat similar to Figure 4 but showing the wrapping mechanism and its associated platform in raised position;

Figure 7 is a front elevation of one of the crimping heads and associated stretching jaws taken substantially on line 3—3 of Figure 2;

Figure 8 is a bottom view of the crimping head shown in Figure 7;

Figure 9 is a rear elevation of a crimping head showing in addition a wrapping mechanism in its raised position, together with a box to be strapped;

Figure 10 is a detail front view of a crimping head and its associated stretching jaws, partly in elevation and partly in section taken substantially on line 10—10 of Figure 8;

Figure 11 is a transverse vertical section of a portion of a crimping and girth-severing mechanism taken on line 11—11 of Figure 10;

Figure 12 is a transverse section of a girth feed mechanism taken on line 12—12 of Figure 10;

Figure 13 is a transverse section of a pair of stretching jaws taken on line 13—13 of Figure 10;

Figure 14 is a transverse section of a crimping head taken on line 14—14 of Figure 7, but showing the crimping jaws in their lower position;

Figure 15 is a view from the rear of a crimping head, partly in section and partly in elevation, taken on line 15—15 of Figure 14;

Figure 16 is a horizontal section through a pair of crimping jaws taken on line 16—16 of Figure 14;

Figure 17 (Sheet 1) is an enlarged detail of the crimping jaws of Figure 14 showing a reenforcing girth positioned over the overlapping ends of the strapping;

Figure 18 is a view similar to Figure 17 but showing the crimping jaws moved together and the tension-resisting crimp formed in the girth and strap ends;

Figures 19, 20 and 21 are a top plan, a bottom plan, and a side elevation, respectively, of a completed crimped joint;

Figure 22 is a perspective view of a box as discharged from the machine after two straps have been applied in spaced relation and the strap ends crimped together;

Figure 23 (Sheet 9) is a rear assembly view in elevation of certain parts of the machine which are located at the rear and to the left (see Fig. 2) of the main frame of the machine;

Figure 24 is a plan view of the parts shown in Figure 23;

Figure 25 is a transverse section of the parts shown in Figure 23, taken on the line 25—25 of Figure 23;

Figure 26 is a transverse detail section taken on the line 26—26 of Figure 23;

Figure 27 is a transverse section of the parts shown in Figure 23 taken on line 27—27 of Figure 23;

Figure 28 is a side elevation of one of the members of a solenoid controlled clutch shown in Figure 23, Figure 28 being taken substantially on line 28—28 of Figure 25 but with the cover plate removed;

Figure 29 is a somewhat similar elevation of the other member of the clutch taken substantially on line 29—29 of Figure 25;

Figure 30 is a somewhat irregular plan section taken on line 30—30 of Figure 28;

Figure 31 is a detail view in elevation of the timing mechanism shown in Figure 23, Figure 31 being taken substantially on line 31—31 of Figure 27, but with the cover plate removed;

Figure 32 is a longitudinal vertical section of one of the strap feeding units located at the front and to the left of the machine, taken substantially on line 32—32 of Figure 2;

Figure 33 (Sheet 3) is an end elevation of the upper portion of the strap feeding mechanism taken on line 33—33 of Figure 32, and Figure 34 (Sheet 12) is a circuit diagram of the electrical apparatus used in controlling the successive operations of the various parts of the machine.

Similar characters of reference refer to similar parts throughout the several views.

In the description to follow, to facilitate an understanding of the machine, the general operations will first be outlined briefly, after which a more detailed description of the machine will be given.

*Brief description*

The successive operations performed by the machine are controlled by an electrical arrangement fully described under the heading "Control circuit", which, for the present, will merely be alluded to. This method of timing the several operations divides the complete cycle of the machine into four more or less distinct periods:

First, wrapping the straps about the box;
Second, fastening the strap ends;
Third, unfolding the wrapping mechanisms, and
Fourth, feeding of succeeding straps.

The first period, which includes the lifting of the box and the encircling of the box with the strapping by means of the wrapping mechanisms, will now be described. In the drawings (Figs. 1 and 2), one of the boxes A, which are of more or less uniform size and construction, is trundled from a conveyor 51 at the front of the machine onto supporting rollers 52, along which the box is moved, the conical conformations of the supporting rollers 52 serving to center the box. Each roller 52 is supported at its ends by means of a transverse bar 53 which in turn is carried at its ends by spaced longitudinal rods 54 which are immovably secured to the front and rear ends of the frame of the machine.

In the machine shown, there is provision for strapping the box with two spaced straps and hence two wrapping mechanisms B are provided, being spaced a suitable distance apart. Each wrapping mechanism B consists of a base bar 55 which extends across the frame of the machine below the bottom of the box as supported by the rollers 52. The base bar 55, together with the associated parts of the wrapping mechanism B, is supported by means of clamps 56 to rails 57 which extend longitudinally of the machine, and which form the platform C. Unlike the rods 54, the rails 57, which lie adjacent to the former, together with the other parts of the platform C, are slidably mounted upon the corner posts 58 of the frame of the machine by means of blocks 59 which are secured to the front and rear ends of the rails 57. The warping mechanism B is thus vertically slidable with the platform C and will be raised when the pinions 60 travel the length of their racks 61, each of which is pivoted to one of the blocks 59 at 62 (Fig. 1).

Secured to the upper surface of each bar 55 and placed at the center of the machine is a stationary guide bar 63 (Figs. 3 and 4), the upper surface of which is channeled, as shown at 64, to provide a raceway for the strapping D as it is fed into the wrapping mechanism, and also to retain the strap during the wrapping operation. Pivoted at each end of the stationary guide bar 63 is a folding arm 65 which in its unfolded position also rests upon the upper surface of the base bar 55.

A pair of cover strips 66 pivoted at 67 beneath the base bar 55 cover the edges of the raceway 64 while the arms 65 are in their unfolded position, and aid in preventing the strap from coming out of the raceway 64 while being fed into the latter. At the initial rise of the platform C, the pivoted cover strips 66 pass upwardly from between the spaced contact points of stationary brackets 68, allowing the inwardly projecting flanges 66′ of the strips to be pulled apart by the action of the springs 69 so that the folding arms 65 may be swung upwardly. The upper surfaces of the cover strips 66 then contact the bottom of the box A, lifting it from its supporting rollers 52, and carrying it upwardly to the crimping heads E. Cam arms 70 are secured to the folding arms 65 by bolts 71 and are pivoted to the wrapping mechanism at 72. As the platform C is raised by the rotation of the pinions 60, the cam surfaces of arms 70 contact the pins 73 mounted on brackets supported by the roller supporting 53, forcing the arms 70 downwardly, and the arms 65 carrying the ends of the strapping upwardly to an ultimate position along the lateral sides of the box, as shown in Figure 9.

As the platform C continues to rise, the upright brackets 74 carried thereon contact the rollers 75 (Fig. 9), which, through a series of bell cranks and links, swing the guide wings 76 about their pivots 77 on the frames 78 of the crimping heads E. These guide wings 76 are timed to fold downwardly just outside of the ends of the strapping as they are folded upwardly, with the result that the ends of the strapping are fed horizontally toward the center of the machine along the guideways 79 (Fig. 10) which are secured beneath the crimping head E and which form a continuation of the downwardly extending wings 76.

As the platform C is raised to its highest point, that is, when the pinions 60 have reached the lower ends of the racks 61, rotation of the pinions 60 is automatically stopped by means which need not here be described, concluding the first period of the cycle of operation of the machine.

Beginning with the second period of operation, a motor F mounted on the forward crimping head E is caused to operate, furnishing the power for all of the moving parts on both of the crimping heads (except the folding of the guide wings 76). In each of the crimping heads, the ends of the strapping D have passed along the guideways 79 and been caught by the stretching jaws 80 and are now stretched toward the center of the crimping heads by the action of the cams 81 upon the yielding bell cranks 82, the lower arms 83 of which bear against stretching jaws 80 until the strapping fits tightly about the periphery of the box and the ends are brought into an overlapping position (Fig. 10).

In each head E, a crimping jaw carriage H reciprocally mounted in a vertical slideway at the center of the crimping head frame 78 is allowed, by the rotation of cam 84 through arm 85 and links 86 (Fig. 15), to fall and sever, by the shear bar 87 (Figs. 10, 11 and 14), a length of a partially formed girth G which is carried on downwardly by the lips 88 of crimping jaws 89 and 90, upon which downwardly turned lateral flanges of the partially formed girth rest. The crimping jaw carriage H comes to rest at a position such that the top web of the girth G just rests upon the overlapping strap ends. The crimping jaws 89 and 90 are forced toward each other by the wedge pin 91 which is pushed downwardly between a pair of rollers 92 and 93 which are mechanically connected to crimping jaws 89 and 90, respectively. This movement of the wedge causes the jaws to crimp the girth G, together with the overlapping strap ends, into a tension-resisting deformation or joint, as shown in Figs. 18 to 21.

Immediately following this, the wedge 91 is caused to rise, allowing the crimping jaws again to separate and release their hold upon the joint, and the crimping jaw carriage H is raised by action of the cam 84 to its upper position. Following this, the cams 81 allow the lower arms of the yielding bell cranks 82 to be returned outwardly by the action of tension springs 94 which are secured to the outside ends of stretching jaws 80, releasing the grip of the jaws upon the strapping.

As shown in the bottom view of the crimping head (Fig. 8), the rails 95 upon which stretching jaws 80 reciprocate are made integral with swinging jaw supporting arms 96 which are pivoted at their outer ends by bolts 97. At the rear of each of these arms 96 and toward their free ends is secured a pair of annular cam rings 98 and 99, within which revolve a mating pair of cams 100 and 101, respectively, which are mounted upon and rotate with one of the vertical shafts 102, which have bearings at the rear of the crimping head frame 78 and are revolved by spiral gears 103 and 104. Cams 101 revolving within cam rings 99 cause the arms 96 to be swung rearwardly about pivots 97, carrying with them the jaws 80, so that the latter are swung free of the strapping. At this point, the third period of the cycle commences with the descent of the platform C, and, hence, of the box A, carrying with it the crimped strapping. The circuit of the motor F is opened but the momentum of the armature together with the associated gearing and other revolving parts continues to revolve the spiral gears 104 and 103 so that cams 100 co-act with cam rings 98 to swing the jaw supporting arms 96, together with the jaws 80, back to their normal position during the "coast" of the motor.

As above indicated, in the third period of operation the pinions 60 are again caused to rotate along the opposite sides of the racks 61, allowing the platform C to descend, carrying with it the box A, which is replaced upon the roller supports 52 and may be trundled away. Simultaneously with the descent of the platform C, the folding arms 65 are allowed to unfold under the action of springs 105 while the guide wings 76 are swung upwardly by the pull of springs 106.

Upon the conclusion of the third period, the fourth period of the cycle follows with the rotation of a horizontal longitudinal shaft 107 which passes through both of the strap feed units I (Figs. 1, 2 and 32). In each unit the shaft carries a knurled wheel 108 which co-acts with a second such wheel 109 directly thereabove to feed the strapping D into the raceway 64 of the wrapping mechanism.

In each feed unit, the strapping D passes from a supply roll 110 over a pulley wheel 111, through a set of straightening rollers, and between the feed wheels 108 and 109. When the correct lengths of strapping have been fed into the raceways, rotation of the shaft 107 is stopped, and solenoids 112 located at the inner end of each of the strap feed units I are actuated, causing shear bars 113 to be lifted upwardly, severing the strapping. The wrapping mechanisms B now carry correct lengths of straps, and the machine is ready for another cycle of operation.

First Period of Cycle (Wrapping the Straps about the Box)

Beginning the more detailed description of the first period of the cycle of the machine, the box A to be strapped, as before stated, is fed along the conveyor track 51 onto the supporting rollers 52, and is moved longitudinally of the machine to a correct position over the wrapping mechanisms B. The supporting rollers 52 carry flanges 114 (Figs. 3 and 6), the inner surfaces of which are conically shaped, serving to center the box in reference to the wrapping mechanisms and the crimping heads, as well as to support the box a short distance above the wrapping mechanism in its unfolded position. The flanges 114 of the supporting rollers are carried upon a hollow shaft 115, the ends of which are journaled, beyond limiting collars 116, in bearing brackets 117 rising from the bars 53. The bars 53 lie transversely of the frame and are supported at their ends upon the spaced longitudinal rods 54 and are longitudinally adjustable upon the latter when the clamps 118 are loosened. The longitudinal rods 54 are rigidly secured to the frame of the machine by brackets 119 (Figs. 1, 6 and 23), which are secured upon the inner edges of each of the four corner posts 58. It will thus be seen that the bearings for the supporting rollers 52 are stationary with reference to the frame of the machine, and do not rise or fall as does the platform C.

As before stated, the various parts of a wrapping mechanism B are mounted upon a base bar 55 which extends transversely of the machine, and which is in turn supported at its ends by longitudinally adjustable clamps 56 upon the spaced longitudinal rails 57 of the platform C (Figs. 3 and 4). The rails are secured at each end to one of a set of four sliding blocks 59 (Figs. 6 and 23). Each sliding block is provided with an upper slide block 120 and lower slide block 121. Each of the lower blocks 121 is supported a vertically spaced distance from the upper block 120 by a downwardly extending arm 122 which is integral with the block 120.

Platform raising means

Secured to the inner face of each of the vertical posts 58 of the frame is a slide bar 123 (Figs. 8 and 24), one lateral edge of which is beveled inwardly, as shown at 124, to provide a dovetail fit with the slide blocks 120 and 121 which co-operate with the slide bars 123 to guide the platform C in its upward and downward movements. The lower slide block (Fig. 6) is made in two pieces 121 supported, as before said, by the arms 122, rather than with the sides of the block connected by a web as the upper block 120, in order that the lower block may pass downwardly beyond the bracket 119 which supports the rod 54, the web of the bracket 119 passing between the slide blocks 121. At the upper end of each of the sliding supports 59 is secured a short shaft 125 which projects beyond the end of the frame of the machine and acts as a pivotal support for a downwardly extending arm 126 through the lower end of which is rigidly secured a plate 127 which supports the rack 61. (To more clearly disclose certain other parts, the rack 61 and the arm 126 are omitted in the elevational Figures 26.) Cables 128 are secured about the ends of the shafts 125, the cables running through overhead pulleys 129 (Fig. 1) to weights 130 which serve to counterbalance the major portion of the weight of the carriage C and the parts which it supports.

Each rack plate 127, in addition to supporting the vertically positioned rack, supports an elongated peripheral guide ring 131, the inner profile of which follows a spaced distance from the periphery of the rack 61 (Figs. 1, 6 and 24.) An elongated annular slot 132 is thus formed between the outer margin of the rack 61 and the inner margin of the guide ring 131 into which an end of the shafts 133, which carry the pinions 60, is allowed to project. Each pinion 60 is so positioned upon and secured to its shaft 133 that the pinion lies in the same vertical plane as the rack 61 and hence is kept continually in mesh there-with, as the end of the shaft confines the movement of the pinion to a path about the rack 61. Vertical adjustment between each rack 61 and its corresponding supporting slide 59 of the platform C is effected by means of a stud 134 and a lock nut 135 on the arm 126.

Outward swinging of the rack supporting plates 127 is prevented by contact with retaining strips 136 supported from the corner post 58 of the frame. The rack plates 127 are free to reciprocate vertically, their outer surfaces sliding along the inner surfaces of the retaining strips 136.

Attention is now called to the means employed for rotating the pinions 60. As before stated, these pinions are secured to the ends of a pair of longitudinally extending shafts 133 which are inwardly spaced from the corner posts 58 and are journaled in brackets 137 secured to the lower ends of the corner posts. Adjacent to the rear brackets 137, the shafts 133 are each provided with spiral gears 138 which are driven by mating gears 139 secured to a transverse shaft 140. This shaft 140 is journaled in sub-brackets 141 supported upon brackets 137. It will thus be seen that by rotation of the transverse shaft 140, all four pinions 60 will be driven in synchronism.

The platform raising transverse shaft 140 is extended to the left (Fig. 2) beyond the main frame of the machine, entering a gear housing 142 (Figs. 23, 24, 25 and 27) where its end is secured to a worm wheel 143 which is driven by a worm 144 on a cross shaft 145 also supported within the gear housing 142. The cross shaft 145 is driven through a clutch member 146 by a spiral gear 147 which in turn is driven by a spiral pinion 148 which rotates with the armature shaft of a motor R. The clutch 146 is normally out of engagement so that the motor R, which is driven continually, imparts no rotation to the cross shaft 145, and hence none to the shaft 140 and the carriage raising pinions 60. The clutch 146 comprises two parts (Figs. 25, 27, 28, 29 and 30),—a driving member 149 integral with the spiral gear 147 and which rotates freely upon the cross shaft 145, and a driven member 150 which is rigidly secured to the cross shaft 145. As shown in the elevational view of Figure 29, the face of the driving member 149 is provided with an annular slot 151 into which project the longitudinal stop pins 152 which, as will be noted, are somewhat flattened on their counterclockwise sides. The mating face of the driven member 150 is provided with a longitudinal hole 153 at the same radius from the axis of the cross shaft 145 as are the stop pins 152 and the slot 151. In this hole 153 is reciprocally mounted a dog 154, to the outer end of which is secured an arcuate wedge plate 155.

Arcuately spaced from the dog 154 is a second hole through the driven member 150, in the counterbore of which is reciprocally mounted the enlarged head of a pin 156 which likewise at its outer end is secured to the wedge plate 155. A spring 157 is interposed between the head of pin 156 and the shoulder of the counterbore, which tends to pull the wedge plate 155 inwardly, thus projecting the inner end of dog 154 into the annular slot 151 of the driving member where it will be contacted by the rotating pins 152. Pivoted upon the short shaft 158 which is mounted in the cover plate 159 of the housing 142 is a wedge arm 160, its inner edge lying in the same vertical plane as the outer face of the driven member 150.

The wedge arm 160 at its end is beveled outwardly, as clearly shown in Figure 30, mating with the inwardly beveled wedge face of the plate 155. When the wedge arm 160 is in its lower position, as shown in Figure 28, the plate 155 is wedged outwardly and thus spaced from the outer edge of clutch member 150, pulling the inner end of the dog 154 within the mating face of the driven member so that it no longer is contacted by pins 152 of the driving member.

Rigidly secured to the outer end of the wedge arm shaft 158 is an actuating arm 161 which, obviously, controls the movement of the wedge arm 160. The free end of the controlling arm 161 is pivoted to a link 162 which in turn is pivoted to the end of the core 163 of a solenoid 164. The solenoid is secured by a bracket 165 to the housing 142. A set screw 166 supported in a lug 167 on the outer face of the cover 159 provides an adjustable stop for the actuating arm 161 which prevents the wedge arm from dropping too far downwardly.

When the operator wishes to start the cycle of operation, he presses a suitably located electric button which causes the electric circuit of the solenoid 14 to be closed, thus pulling the core 163 upwardly, actuating the arm 161, and swinging the wedge arm 160 upwardly and out of contact with the wedge plate 155, which allows the latter to be moved inwardly under pressure of the spring 157 so that the inner end of the dog 154 is allowed to enter the annular groove 151 of the driving member and be caught by one of the pins 152 as it rotates. This causes the driven member 150 to be rotated together with the cross shaft 145 which, through the series of shafts and gears before described, causes the pinions 60 to be rotated. The platform C is thus raised to its upper position, at which time a fibre finger 168 (Fig. 23) closes the normally open spring contact 169 which, in a manner later described, opens the circuit of the solenoid 164, allowing actuating arm 160 to fall under the weight of the core and bringing the wedge arm into the path of the rotating wedge plate 155 which holds the dog 154 out of engagement with the pins 152 of the driving member.

The driven member is brought to an immediate and positive stop by the contacting with the end of wedge arm 160 of a pin 170 secured to the outer face of the driven member just without the wedge plate 155. In this way, there is no possibility of the wedged end of arm 160 striking against the pin 156 and injuring its associated parts.

*Wrapping mechanism*

Referring again to one of the wrapping mechanisms B (Figs. 3 and 4) which are operated by the raising of the platform C as controlled by the clutch 146, it will be noted, as before stated, that upon the base bar 55, which extends transversely of the machine, is rigidly secured a stationary guide bar 63. The guide bar 63 is provided on its upper face with a groove having inwardly tapering edges forming a raceway 64 for the strapping D as it is fed into the wrapping mechanism. At its extremities, bolts 72 pass transversely of the bar 63 and support at the one side the cam arm 70 and at the other side a bar plate 176, each of the latter being held a spaced distance from the bar 63 by sleeves 177.

Resting upon the base bar 55 at each end of the center guide bar 63, but not secured thereto, is a folding arm 65 which is provided on its upper side with a similar raceway 64. A plurality of bolts 71 pass transversely of each folding arm 65 and pass through the cam arm 70 and the bar plate 176 and are provided with similar spacing sleeves 177. It will thus be seen that each folding arm 65, as well as the cam arm 70 and plate 176, pivots about the bolt 72 as an axis. As indicated at 178 (Figs. 3 and 9), the ends of the rigid guide bar 63 are rounded off at the upper edges so that the folding arms 65 are free to swing upwardly without any pinching of the edges. Each arm 65 is held in its unfolded position, resting upon the upper surface of the base bar 55 by a tension spring 105 which is interposed between one of the bolts 72 and the end of a spring bracket rod 175, the latter being threaded into the under side of the base bar 55.

At that end of the wrapping mechanism B which lies adjacent to the strap feed unit I, a short guide bar 179, similar to the rigid guide bar 63, is supported upon the upper surface of the base bar 55 and extends from the outer end of the left folding arm 65 (Fig. 3) to the left end of the base bar 55, which, it will be noted, is immediately adjacent to the shear bar 113. Each arm 65 is provided at its end face with a pair of jaw plates 180 which are pivoted thereto by screws 181 and carry at their free ends jaws 182. At their lower ends, that is, at the ends opposite the jaws 182, the jaw plates 180 are provided with flat cam surfaces 183 which, when the arms 65 are in their unfolded position, are contacted by the upper surface of the bar 55 with the result that the jaws 182 are spread apart so that they offer no impedance to the strapping D as it is fed into the raceway. The jaws are at all times urged together by the force of spring clips 184 secured to the lateral edges of the arms 65. A correct length of strapping, it may be added, when fed into the raceway extends beyond each free end of the folding arms 65 a distance equal to the length of the short guide bar 179.

As previously stated, vertical cover strips 66 are provided for the raceway 64, the inwardly turned flanges 66' of which overlie the margins of the raceway grooves in guide bars 65 and 179 and the arms 65. In its normal position, the vertical portion of each cover strip 66 lies in contact with the outer sides of the guide bars 63 and 179 and the arms 65, and at its lower end carries a plurality of inwardly extending lugs 185 through which pass pivot pins 67 which are supported by brackets 186 depending from the bottom side of the base bar 55. It is apparent that the cover strips 66 pivot about the pin 67 as an axis (Fig. 6), being urged apart by the tension spring 69 which connects the downwardly extending spring brackets 187 which are secured to the sides of strips 66. The function of the cover strips 66 is to provide retaining means for the margins of the raceway 64, supplementing the inwardly beveled edges of the latter. This will make it impossible, should the forward end of the strapping bind at any point in the raceway, for the strap to buckle in a vertical plane and throw part of itself upwardly out of the raceway.

When the platform C is in its lower position, the inwardly turned flanges of the cover strips are held together against the tension of the springs 69 by the contact pins 188 which are supported upon each of the stationary rods 54 by longitudinally adjustable clamps 189. At the initial rise of platform C, which carries with it the wrapping mechanisms and the cover strips 66, the contact arms will cease to bear against the sides of the strips 66, permitting them to be spread apart so that the folding arms 65 will be allowed sufficient space between the inwardly turned flanges and the cover strips to swing upwardly about their pivots 72 when the cam arms 70 are actuated. Slots 174 are provided at the upper edges of cover strips 66 through which bolts 71 with spacing sleeves 177 may pass as the arms 65 are swung upwardly. (This is clearly shown in Figure 9.)

Supported upon the adjacent roller supporting bars 53 are brackets 190 which are offset toward the wrapping mechanisms and are provided with obliquely spaced cam contacting pins 73 and 73′ which extend into the vertical plane of the cam arms 70.

From an inspection of Figure 3, it will be seen that following the initial rise of the platform C, the pins 73 will be contacted by the surfaces 191 of cam arms 70, and that due to the comparatively short effective leverage upon the cam arms, the arms 65 will be swung upwardly the major portion of the 90° through which they move when the platform is raised but a minor portion of its complete rise.

As the platform C continues to rise, the curved outlines 191′ of the cam arms 70 will reach the pins 73. At this time the second pins 73′ on the brackets 190 will contact the curves 191′, swinging the cam arms away from the pins 73. At the end of the platform rise, the pins 73′ will be contacting the flat portions 191″ of the cam arms, causing the folding arms 65 to lie adjacent to the sides of the box A, as shown in Figure 9.

The purpose of employing the two cam contacting pins 73 and 73′ rather than single pins is to effect a quick initial swing of the folding arms 65 and at the same time use cam arms which in their normal position (Fig. 3) lie below the bottom of the box A.

Introduction of strap ends into crimping head guideways

In Figure 7, which is a front elevation of one of the crimping heads, the folding arms 65 carrying the ends of the strapping D are shown as having been swung upwardly through approximately 45° of their movement so that the free ends of the strap lie adjacent to and at the inner side of the downwardly folding guide wings 76. It will be remembered that with the rise of the platform C, there are also carried upwardly the upright brackets 74 secured adjacent to each end of the wrapping mechanism to one of the rails 57 by clamps 192 and 193 which provide adjustment of the brackets longitudinally of the rails. When the arms 65 have reached the full line position of Figure 7, the upper ends of brackets 74 have reached their full line position of Figure 7, at which point they contact the short arms of bell cranks 194 which are pivotally secured at 195 to brackets 196 depending from the crimping head frame 78. The upper arms of the bell cranks 194 are thus caused to push links 197 inwardly (Figs. 7 and 9), rotating through the arms 198 cross shafts 199 mounted in lugs 200 also depending from the crimping head frames 78. Pivoted about the axes of the shafts 199 and rigidly secured to the shafts are the folding guide wings 76 which are normally held swung upwardly by tension springs 106, the fixed ends of which are secured to the frames 78 by brackets 201. It will thus be seen that as the ends of the brackets 74 contact the bell cranks 194, the guide wings 76 will be swung downwardly, enveloping the free ends of the strapping D (see dotted line position in Fig. 7) which will, as the platform C continues to rise and the guide arms 65 continue their rotation, be guided by the easy curve of wings 76 and guides 79 from a vertical to a horizontal path and be pushed toward the center of the machine and into the crimping jaws 80. Figure 9 shows a rear view of a wrapping mechanism and a crimping head at the time the former has reached its uppermost position.

As indicated in Figure 7, and as fragmentarily shown in Figure 10, the guide wings 76 comprise curved back plates 202 and rather wide sheet metal flanges 203 secured at the sides thereof. The lateral flanges 203 are flared outwardly, as shown in Figures 6 and 8, in order that the free ends of the strap may be correctly directed to the guide member 202. When the guide wings 76 are swung to their lower positions, the inner surfaces of their guide plates 202 mate the guide surfaces of the stationary guide member 79 of the crimping head, and the flanges 203 of the wings form continuations of the flanges 204 of the stationary guide 79. The wing guide and the stationary guide thus form a continuous raceway for the ends of the straps as they are moved toward the center of the machine, functioning, as before stated, to guide the strap end as it is held in a substantially vertical position by the guide arm 65 into a horizontal path and direct each end into one of the stretching jaws 80 of the crimping head.

It may be here stated that the crimping head frames 78 are mounted upon spaced supporting bars 205 which extend longitudinally of the machine and are secured at their ends to the vertically adjustable transverse bars 206 (Fig. 1) which will be more fully described herein later. The crimping heads E are longitudinally adjustable upon these supporting bars 205, being secured thereto by clamping members 207 beneath the supporting bars which are clamped to flanges on the frame 78 by bolts 208. In Figures 7, 8 and 10, it will be seen that the clamping members 207 are made integral with the stationary guides 79 and with the depending lugs 200 which support the pivot shafts 199 of the wings 76, and that the pivot brackets 196 of the bell cranks 194 are secured to the lower edge of clamping members 207 by means of bolts 208, as are also the spring brackets 201.

Second Period of Cycle (Fastening the Strap Ends)

1. Stretching of the straps

The second period of the machine's cycle divides itself into five operations of the crimping heads E, the first of which—the stretching of the strap ends into overlapped relation by the stretching jaws 80—will presently be described.

At the completion of the first operation, as before stated, the contact fingers 169 upon one of the rear posts of the machine are engaged by the finger 168 when the platform C has reached its uppermost position, which opens the circuit of the solenoid 164, allowing the clutch 146 to be thrown out. This also results in the closing of the circuit of the crimping head motor F mounted upon one of the crimping heads E. The armature shaft of the motor F is coupled to a worm shaft 209 (Fig. 9) which is journaled in the frame 78 and which carries a worm 210 driving a worm wheel 211 which is secured to a toothed shaft 212, extending through both of the crimping heads E.

At the rear of each crimping head is a set of four meshing gears 213, 214, 215 and 216, all of the same diameter, which are mounted with their axes extending longitudinally of the machine and all lying in the same horizontal plane. The gear 213 which lies adjacent to the motor end of the crimping head meshes with the driving pinion 212, thus driving all four gears simultaneously. These gears 213, 214, 215 and 216 are rigidly secured to shafts 217, 218, 219 and 220, respectively, the rearward ends of the shafts being journaled in a bearing plate 221, while their forward ends are journaled in suitable bearings in the crimping head frame 78. It will thus be seen that these four shafts will be rotated simultaneously and at the same rate of speed, although two of the shafts will be rotated clockwise while the other two will be rotated counter-clockwise. These four simultaneously rotating shafts make one revolution during the strapping of a box.

Stretching jaws 80, it will be remembered, are reciprocably mounted upon T-shaped rails 95 integral with the supporting arms 96 which are held directly beneath the frame 78 by pivotal bolts 97. Slots 223 (Fig. 13) at the inner side of the stretching jaws cooperate with the T-shaped rails 95 to guide and support the jaws in their reciprocating movement. Each jaw is provided at its forward end and adjacent to its lower edge with a horizontal slot 224 (Figs. 7 and 10), the outer edge of which is open, and with a vertical slot 225 at its forward end extending upwardly from the horizontal slot 224. Pivotally mounted within this vertical slot 225 is a depending jaw or dog 226, the free end of which is cammed out of an arcuate margin so that when the end of the strapping is fed through the slot 224, a forward movement of the stretching jaw 80 will result in the further downward swinging of the dog 226, whereby the end of the strapping is grasped with great frictional force which increases as the tension upon the strap increases.

A light coil spring 227 is interposed between the pivot screw of the dog 226 and the free end of the latter to give the dog an initial grasp upon the strapping. By its upwardly turned flange 228 (Figs. 10 and 13) a horizontal guide plate 229 is secured to the back portion of the jaw 80 in which are contained the slots 223. When the jaw is in its rearward or relaxed position, the bottom surface of this horizontal plate 229 forms a continuation of the bottom guiding surface of the stationary guide 79. Secured to the bottom of the crimping jaw 80, and at a spaced distance below the horizontal plate 229, is a second horizontal plate 230 somewhat shorter than the plate 229.

As led by the guides 79, the strap end is fed into the stretching jaw between these two plates 229 and 230 which are slightly tapered from the end where the strap is received. Each stretching jaw 80 is urged backwardly, that is, away from the center of the machine, by a tension spring 94, one end of which is secured to the clamp member 207, and the other end of which is secured to a rod 231 which is carried at the rear end of the jaw 80. Pivotally mounted upon a stub shaft 232, at each side of the center of the crimping frame 78, is a yielding bell crank 82 which is composed of two members, the lower or driven member 83 of which carries a roller 233 which bears upon the back of the enlarged head of the jaw 80. The upper or driving member of bell crank 82 itself forms a bell crank, the upper arm bearing a roller 235 which is engaged by the cam 81 mounted on the roller 219 (218), while the lower arm provides a socket for the reception of the T-head of a rod 236 which passes through a funnel-shaped aperture in the upper arm 237 of the lower or driven member 83. Interposed between a nut 238 at the upper end of rod 236 and the upper surface of the arm 237 is a helical expansion spring 239 which serves continually to urge the roller bearing extremities of the members 234 and 83 against the cam 219 and the stretching jaw 80, respectively, being limited by the adjustable stop screw 239' carried upon the lower arm of the member 234. The driving member 234 is bifurcated, forming at its center a vertical slot in which the driven member 83 may move.

At the beginning of the second period of the cycle, each strap end has been fed into a stretching jaw 80, and as the cams 81 are rotated upon their shaft, the rollers 235 are moved outwardly, pulling downwardly upon the rods 236 which, through the medium of the nuts 238 and the springs 239, press downwardly upon the arms 237 of the driven members 83, causing the rollers 233 to push against the stretching jaws 80, moving them inwardly against the tension of the springs 94 and thus stretching the strap tightly about the box. It may be explained that the jaws 180 at the ends of the guide arms 65 yield against their spring clips 184 to allow the strap D to be pulled from the raceway 64.

During substantially the first 90° of rotation of the cams 81 in the direction indicated by the small arrows, the stretching operation is accomplished, the strapping having been cut to such a length that the ends overlap a suitable distance as in Figure 10. Should the box be a trifle larger in its perimeter than that for which the strap is cut, the strapping cannot with safety to the box be stretched so far as it could if the box were of the correct perimeter. Hence, the tension of the springs 239 is so adjusted by the nuts 238 that after the strapping has been stretched to a tautness of maximum safety, the members 83 will cease to be moved, the further rocking of the driving members 234 merely resulting in a downward movement of the rods 236 and the compression of the springs 239. During the second 90° of rotation of the cams 81, it will be noted that the arcuate surface of the cams holds the stretching jaws 80 in their inmost position, during which time the crimping jaw carriage H descends and the crimping joint is made, as will presently be described.

At the inner end of each arm 96, which supports a crimping jaw 80, is threaded or otherwise secured a horizontal pin 240 (Figs. 8, 10 and 11) which extends outwardly adjacent to the bottom surface of the arm 96, the upper face of which is flattened to provide a transversely inclined surface for the strapping to ride upon as it is fed into the overlapping position by the stretching jaws 80. On the left side (Figs. 7 and 10) of the middle of crimping head D, a vertical plate 241 depends from a bracket 242 on the frame 78, the plate lying in a plane at right angles to the strapping as it projects beyond the crimping jaw 80.

The strap passes through a slot 243 at the bottom of the plate 241 which is formed by the inwardly turning of the lateral flanges 244. A spring clip 245 is secured to the plate 241 directly above the aperture 243, the forwardly projecting portion of clip 245 pressing against the pin 240. The forwardly turned flanges 244 serve as lateral guides to center the strapping while the pin 240 and the clip 245, between which the strapping passes, serve to center the strapping vertically. In this manner, one end of the strapping is so directed that it will come into a correct overlapping position with its other end. A very similar guiding mechanism is used on the right hand side of the crimping head, the only material difference being that the vertical plate 241' instead of being secured to a bracket such as 242 is secured to a heavier vertical plate 246, which in turn is secured to a bracket 276 on the frame 78 as will later be described.

2. *Positioning of girth on overlapped strap ends*

The stretching of the strap ends by the jaws 80 constitutes the first operation of the second period of the complete cycle of the machine. The second operation comprises the descent of the crimping jaw carriage H, the forming of a girth G at the end of the strip of sheet metal fed from a supply roll, and the severing of a length of pre-formed girth. The crimping jaw carriage H comprises a frame which is reciprocable in a vertical way or slot 78' in the frame 78, the lower end of the slot being open. How the carriage H is reciprocated will now be explained.

A pair of spaced links 86 are pivoted by a pin 247 to a lug at the rear of the frame of the carriage H, the upper ends of the links being pivoted to the free end of the raising arm 85 which is pivoted to the transverse shaft 220 (see Figs. 9, 14 and 15). The raising arm 85 carries a roller 85', which is contacted by the cam 84 rigidly secured to the shaft 219. During the stretching of the jaws 80, the raising arm 85 is supported in its uppermost position by the contacting of the roller 85' on the dwell surface 84' of the larger radius of the cam, but at the completion of the stretching operation, the cam 84 permits the roller 85' to drop rapidly to its lowest position, which allows the crimping head carriage H to descend to its lower position, as shown in Figures 14 and 15. To make the descent of the carriage more certain and rapid, a kicking arm 172 is provided, one end of which is pivoted at 173 to the crimping head frame 78, while the other end rests upon the top of the carriage H. A cam 174 secured to the shaft 218 adjacent to the cam 81 is adapted to engage the upper edge of the kicking arm 172 immediately after the carriage is released, for the purpose of giving the carriage H an initial kick downwardly to overcome any tendency to bind, due to friction and the like.

The girth G is led in the form of a flat strip from a suitable supply roll 248 carried on the crimping head frame 78, under a pulley 249, and along a raceway at the upper surface of a die bar 250, passing under a pair of knurled feed wheels 251 (Figs. 7, 10 and 12). In Figure 10 a partially formed girth is already positioned in the crimping jaws 89 and 90. At the initial descent of the carriage H, the shearing plate 87 severs the correct length of girth, carrying it downwardly to rest upon the overlapped strap ends (Fig. 11).

The upper lateral edges of the inner end of the die bar 250 are beveled, as shown at 250'. Directly above the outer end of the die bar is a moving die member 222, which is carried upon the carriage H and is slightly yieldable vertically against the pressure of the springs 252. The moving die member 222 is provided with a depression 251' of a conformation similar to that of the upper edge of the die bar 250, whereby, when the carriage has descended, lateral flanges G' are struck downwardly from the girth G.

3. Crimping of joint

The third operation of the second period of the cycle comprises the crimping of the overlapped strap ends, together with the girth, into a tension-resisting deformation, the detailed description of which follows:

As soon as the cam 84 has allowed the carriage H to descend to its lower position, cams 253, secured on the shafts 218 and 219 (Figure 15), engage rollers 254 at the pivot points of pairs of toggle links 255 and 256, the upper ends of which are pivoted at 255' to the frame 78 and the bottom ends of which are pivoted to a block 257 adjustably secured at the upper end of the wedge pin 91. In this way the wedge pin 91 is pushed downwardly with increasing force, forcing apart the rollers 92 and 93 between which the wedge of the pin enters. As shown in Figures 14 and 16, the rollers 92 and 93 are pivoted upon pins 258 and 259, respectively, which pass through horizontal slots 260 in the frame of the carriage and are urged together by tension springs 261 at their outer ends. The pin 258 is journaled in the sides of a channel member 262, which is closed at its forward end to constitute the jaw member 89. The pin 259 is journaled in a block 263, the forward end of which is reduced, as indicated at 263', to receive the upper bifurcations 264 of the other jaw member 90 to which the block is secured. The channel member 262 and the block 263, it will be seen, are reciprocable mutually and with reference to the frame of the carriage H, by the wedging action of the pin 91. The downward push of the wedge pin 91 obviously will force each of the crimping jaws 81 and 90 simultaneously toward each other, forming a deformation in the girth and strap, the details of which will now be described.

Referring to Figures 14 (Sheet 8), 17 and 18 (Sheet 1), it will be seen that a block or chair 264 is secured by a threaded stud 265 to the frame of the carriage H, the chair 264 being positioned midway between the movable jaws 89 and 90 and directly over the overlapped strap ends and the girth G. The jaws 89 and 90 are each provided with a pin 266, the inner end of which is cut away to form a jaw 266, which will travel just beneath the chair 264 in the reciprocation of the jaws. As the jaws are moved together, their lips 88 turn the lateral flanges of the girth G inwardly to fold beneath the lateral edges of the strapping. The lateral edges of the girth and strapping are then engaged by the jaws 266' which force the back of the girth, together with the strapping, against the under surface of chair 264. By swinging the lateral edges of the joint downwardly into the form shown in Figure 18, the overlapped strap ends are formed into an effective tension-resisting deformation, the girth G being similarly deformed and serving to prevent the relative displacement of the strap ends from the joint.

A slot 262' is provided in one side of the channel 262 and the carriage frame H through which the end of the die bar 250 may pass (Figs. 8, 10, 11 and 16).

4. Release of crimped joint

The fourth operation comprises, (a) the release of the stretching jaws 80, (b) the ascent of the crimping jaw carriage H to its upper position, and (c) the simultaneous swinging back of the jaw supporting arms 96, whereby the stretching jaws 80 entirely disengage the strapping D. (a) The stretching jaws 80 are held in their stretching position by the cams 81 until the crimp has been made in the strapping, at which time the cams allow the rollers 235 to drop back to their original position, releasing the jaws 80 so that they may be pulled back to their normal position by the springs 94. The strap engaging dogs 226 of the stretching jaws 80 obviously release their grip upon the strapping by the backward movement of the jaws.

To explain the ascent (b) of the carriage H, when the toggle pivot rollers 254 (Fig. 15) have been pushed inwardly as far as possible by the cam 253, the crimping operation has been completed and the rear face of the cam 253 allows a quick return of the toggle links under the force of the expansion spring 267 which lies around the wedge pin 91. This allows the tension springs 261 to pull the roller pins 258 and 259 together to again separate the crimping jaws 89 and 90. Continued rotation of the shaft 219 (Fig. 15) causes the cam 84 to swing the raising arm 85 upwardly, carrying with it through the link 86 the crimping jaw carriage H, until the roller 85' again contacts the outer dwell 84' of the cam, holding the carriage in its upper position for the remainder of the cycle.

The free end of the girth strip G, which has been partly formed by the die member 222 (Figs. 10 and 11), is prevented from being carried upwardly by contact with the shear plate 87 of the carriage H in the latter's ascent, by means of a vertical rod 268, the rounded lower end of which rests upon the top of the girth adjacent to the end of the die bar 250. The rod 268 is yieldable vertically against the pressure of a compression spring 269 (Fig. 7).

As before mentioned (c), simultaneously with the ascent of the crimping jaw carriage H, the jaw supporting arms 96 are swung backwardly about their pivot bolts 97 by which they are secured to the under side of the crimping head frame 78. As shown in the rear elevation of the crimping head (Fig. 9), the outer gears 213 and 216 mesh respectively with similar gears 270 which are secured to transverse shafts 271 which carry the spiral gears 104 previously referred to. The shafts 271 are journaled in suitable bearings in the crimping head frame 78 and carry spiral gears 104 which mesh with spiral gears 103 secured to vertical shafts 102 (Figs. 8, 9 and 15). These vertical shafts 202 are journaled in suitable bearings at the back side of the frame 78 and carry at their lower ends pairs of cams 100 and 101 which are disposed in the planes of pairs of cam rings 98 and 99, respectively. Each pair of cam rings 98 and 99 is mortised into the back and under side of one of the stretching jaw supporting arms 96, being secured thereto by screws, or other suitable means. It will be observed that in the bottom view of the crimping head (Fig. 8) at the left side, the cam 100 and its associated cam ring 98 are at the bottom, while on the right hand side the cam 101 and its cam ring 99 are on the bottom. This is done in order to obviate the necessity of reversing parts for the cams and cam rings.

Referring still to Figure 8, the shaft 102 shown at the right rotates counterclockwise, as indicated by the small arrow, while the shaft to the left rotates clockwise. By the beginning of this fourth operation of the second period of the cycle, the points 101' of the cams 101 have been rotated until they contact the inwardly projecting cam surfaces 99' of the associated cam rings 99. The continued rotation of the shafts during this fourth operation obviously results in a swinging of the arms 96 about the pivot bolts 97 to the position indicated in dotted lines at the left of the figure.

As before intimated, the purpose of the backward swinging of the stretching jaw supporting arms 96 is to take from under the strapping D all those parts of the crimping heads E which lie beneath it, in order that the box A may descend, carrying with it the bale strapping D. To be more specific, the stretching jaws 80, being mounted on the arms 96, will be carried backwardly, the strap passing through the lateral edge of the slot 244 and from between the plates 229 and 230. The horizontal pins 240, which extend laterally from the free ends of the supporting arms 96, are also carried backwardly.

5. Return of jaw supporting arms

In point of chronological order, the third period of the machine's cycle of operation commences at the time that the crimping jaw carriage H reaches its upper position, and the supporting arms 96 are swung to their outward position. The platform C then descends and the wrapping mechanism unfolds. However, as mentioned earlier in this specification, the fifth and final operation of the crimping heads E overlaps the beginning of the third period to allow (a) the supporting arms 96 to be swung back to their normal position after the box has descended far enough to remove the strapping from the crimping heads E, and (b) the feeding the pre-formed girth into the crimping jaws.

(a) Referring to Figures 9 and 14, it will be noticed that the transverse shaft 219 in the forward crimping head E is provided at its end with a fibre cam disc 278, which rotates in a counterclockwise direction. At the end of the fourth operation of the crimping head—that is, when the arms 96 are swung to their backward position—the cam projection 278' of the disc 278 closes the contact fingers 279 and 280, which are supported by, but insulated from, a bracket 281 on the bearing plate 221. In a manner which will later be described, the closing of these contact fingers results in the opening of the circuit of the motor F.

Experience with this machine has shown that there is ample momentum in the armature shaft of the motor and in the associated gearing to "coast" the several moving elements so that the shaft 219 will rotate through almost 90° after the closing of the contact fingers. This "coast" rotates the vertical shaft 102 (Fig. 8) causing the points 100' of the cams 100 to engage the depressions 98' of the associated cam rings 98 and thus return the supporting arms 96 from their dotted line to their original positions.

Girth feed (b) The end of the shaft 271 at the right (Figs. 7 and 10) is provided with the small crank pin 272 which actuates a reciprocating pawl 273 to give intermittent rotation to a ratchet 274 to which are secured the feed wheels 251 for the girth strip G. The crank pin 272 is so located that during the "coasting" of the motor F the pawl 273 will be pulled backwardly (to the right, Fig. 10), to feed the pre-formed end of the girth G onto the lips 88 of the crimping jaws 89 and 90, where the girth will be in position for severance when the carriage again descends.

As shown in Figures 7, 10 and 12, the pin 275, upon which the ratchet 274 and the feed wheels 251 rotate, is eccentrically journaled in the bracket 276 secured to the lower outer side of the crimping head frame 78. The eccentric pin 275 is urged counterclockwise by a tension spring 277, whereby a suitable leverage is obtained to force the knurled feed wheels 251 against the lateral edges of the girth strip G.

Having been returned to their normal positions, the crimping heads E so remain until another box is strapped.

Third Period of Cycle (Unfolding the Wrapping Mechanisms)

The closing of the contact fingers 279 and 280 at the rear of the forward crimping head E results not only in the opening of the circuit of the crimping head motor F, but also in the re-energizing of the solenoid 164 (Fig. 23) previously referred to. This causes the throwing into engagement of the clutch 146, whereby the transverse shaft 140, through the longitudinal shafts 133, rotates the pinion 60 to cause the racks 61 to descend to their original position, as shown in Figure 1. This lowers the platform C, returning the box A to the rollers 52, allowing the guide wings 76 to be swung upwardly by the springs 106 and unfolding the wrapping mechanism B so that the strap folding arms 65 again lie upon the base bars 55. The cover strips 66, as they descend, are caught by the spaced contacts 188, swinging the strips into vertical planes so that the inwardly projecting flanges 66' again cover the raceways 64. As the platform C reaches its lowest position, the fibre finger 168 (Fig. 23) closes a lower contact finger 281, which, as explained under "control circuit", results in the opening of the circuit of the solenoid 164, allowing the clutch 146 to be thrown out to stop the rotation of the pinions 60.

Fourth Period of Cycle (Feeding of Succeeding Straps)

Strap feeding units

The fourth and final period of the machine's cycle comprises, first, the feeding of a length of strapping, into the raceways 64 of each wrapping mechanism B, and second, the shearing of these lengths of strapping by the shear bars 113. The construction of the strap feed units I which are mounted to the left (Fig. 2) of, and in alignment with, the wrapping mechanisms B, will first be described. Each unit comprises a supply roll 110 (Fig. 32) wound upon a supply spool 282. The supply spool is disposed between the vertical walls 283 of the unit I and rests upon a plurality of rollers 284, so that it is free to revolve as the strapping is drawn from the roll. The roller 284 at the left (Fig. 32) is pivoted upon the free end of an arm 285, the opposite end of which is pivoted at 286 to the plates 283. The arm 285 is normally held in its upward position by a cam 287 which is pivoted to a shaft 288 journaled in the plates 283. The cam 285 is controlled by a hand lever 289 so that when it is desired to remove the spool 282 and insert a new roll of strapping, the hand lever 289 is moved clockwise, permitting the cam 287 to drop the arm which carries the retaining roller 284. The spool 282 may then be easily rolled out from between the plates 283 and a new one inserted.

From the supply roll 110, the strapping D is led over a pulley wheel 111, and through a set of straightening rollers in a housing 290, the set comprising a pair of rollers 291 having stationary pivots and a second pair of rollers 292 having pivots vertically adjustable by means of the threaded rods 293. From the straightening rollers, the strap passes horizontally across a track 291, passing between the knurled feed wheels 108 and 109, which, by means of gears 294 and 295, are revolved in synchronism by the shaft 107, as stated earlier in this specification. The shaft 296, to which are secured the feed wheel 109 and the gear 295, is journaled in the bifurcated end of a feed pressure lever 297, which is pivoted on a pair of trunnions 298. The end of the feed pressure lever 297 opposite from the shaft 296 is urged upwardly by an expansion spring 299, whereby a pressure of the idling feed wheel 109 upon its mating feed wheel 108 is effected, this pressure being variable by means of a thumb screw 299' in the end of the lever 297.

Strap feed control

The feed shaft 107 is so controlled that it rotates the feed wheels 108 in the strap feed units I a sufficient number of times to feed a correct length of strap into each of the raceways 64 of the wrapping mechanisms. The means for controlling the movement of the feed shaft 107 will next be described.

The feed shaft 107 extends longitudinally of the machine to the rear thereof, where it is journaled in a carriage 300 (Figs. 23 to 27), which is supported upon a frame 301, which also supports the continually running motor R. Adjacent its journals in the carriage 300, the shaft 107 is provided with a worm wheel 302 which is engaged by a worm shaft 303 extending transversely of the shaft 107, but longitudinally of the frame 301. The outer end of the worm shaft is secured to the driven member of a clutch, indicated at 304, while to the driving member of the clutch is secured a spiral gear 305, which in turn is driven by a second spiral gear 306 secured to the upper end of a vertical shaft 307, the lower end of which carries a spiral pinion 308 which is driven by the previously described spiral pinion 148 secured to the armature shaft of the continually running motor J. The clutch 304 is similar to the clutch 146 (Fig. 25) previously described and is controlled by a solenoid 309 which is carried by a bracket 310 secured to the top of the housing 142.

Referring now to Figures 27 and 31, a worm wheel 311 is disposed immediately beneath the worm shaft 303, the worm wheel being secured to a shaft 312 journaled in a housing 313 which is supported from the frame 301. The pinion 314 is also secured to the shaft 312, and adjacent the pinion a bearing bracket 315 is pivotally mounted upon the shaft 312 and carries at one end an intermediate gear 316. The intermediate gear 316 in turn engages a timing gear 317 mounted upon a stationary shaft 318, which is also supported by the housing 313. It is to be noted that the bracket 315 is angularly adjustable about its supporting shaft 312 by means of a bolt 319 which co-operates with a slot 320 formed in a projecting portion 321 of the housing 315. This adjustment is provided so that a different size of timing gear 317 may be substituted when it is desired to vary the length of strapping fed into the wrapping mechanism. This point will be more fully discussed later under "adjustment for box sizes".

Spaced a short distance outwardly from the timing gear 317, but non-rotatably secured thereto, is a fibre cam disc 322 having a cam point 322' which is adapted to close a pair of contact fingers 323 and 324 and also a second pair of contact fingers 325 and 326. These two pairs of contact fingers are supported at the ends of, but insulated from a bracket 327 secured to the outer end of the stationary shaft 318. The timing gear 317, together with the fibre cam 322, makes one revolution to feed a proper length of strapping into the wrapping mechanisms. At the close of a revolution, the cam point 322' again closes the contact fingers 323 and 384, which results, as will later be explained, in the de-energizing of the solenoid 309, which releases the clutch 304, stopping the rotation of the feed shaft 107. The cam point 322' in the course of its revolution, also closes the cam fingers 325 and 326, the purpose of which will subsequently be explained.

The timing gear 317, together with the other elements of the timer, are preferably encased by a cover 317' which is supported on the stationary shaft 318 and is provided with a boss embracing the shaft 312 to prevent its rotation about the shaft 318.

*Severing of strap lengths*

The feeding of the strapping into the wrapping mechanisms B having been completed, the second operation is the severing of the lengths of strapping. When the solenoid 309 is de-energized, the contact fingers 328 and 329 (Fig. 23) which are supported above, and insulated from, the solenoid supporting bracket 310, are closed by the enlarged end of a tail piece 330 at the upper end of the core of the solenoid 309. The closing of these contacts, as will later be explained, permits the energizing of the solenoids 112, which control the shear bars 113 (Figs. 2, on Sheet 2, and 32, Sheet 11, and Fig. 33, Sheet 3). On each strap feed unit I, one of the solenoids 112 is positioned, being secured by means of a bracket 331. The lower end of each solenoid core is pivoted to a shear bar 113, one end of which is pivoted by a bolt 332 upon the opposite side of the unit I. The upper or shearing edge of each shear bar 113 is indicated at 113', this edge being located beneath the strapping D as it enters the wrapping mechanism B. Directly above the strapping D, and immediately to the left (Fig. 32), is a shear plate 333 which co-operates with the shear bar 133 to shear the strapping D when the solenoid 112 is energized. The shearing plate 333 may be properly set by means of adjusting screws 333'. One of the solenoids 112 is provided with a pair of contact fingers 334 and 335, which are opened by the tail piece 336 of the core of the solenoid when the latter is energized. The opening of these contact fingers, as described under "control circuit", results in the opening of the circuit of the solenoids 112, whereby the latter are de-energized allowing the shear bars 113 to drop back to their original positions, at which time the fourth period of the cycle of the machine has been completed and the machine is ready for a new cycle.

It is to be observed that, during the interval of time represented by the fourth period, the box A is resting upon its supporting roller 52, and that there is no movement of the wrapping mechanism other than the feeding into the raceway 64 of the strapping D. For this reason, the operator can push another unstrapped box from the conveyor 51 into position upon the supporting rollers 52 and to push the recently strapped box across the rollers 52 and out the rear of the machine onto the second conveyor 51'. In this way the operation of the machine may be practically continuous, the operator pressing the starting button as soon as the strapping has been severed by the shear bars 113.

CONTROL CIRCUIT

It has been repeatedly mentioned in this specification that the successive functioning of the various parts is electrically controlled by a series of mechanical and solenoid contacts. The circuit for this control is shown in Figure 34 (Sheet 12). A suitable panel 340 is mounted in any convenient place and carries six solenoids, J, K, L, M, N and O, all of which are provided with fibre cross members at the lower ends of their cores for the purpose of engaging adjacent contact fingers. A lead wire 343 from any suitable current supply leads directly through a double pole switch 344 to a negative busbar P at the bottom of the panel 340 while the other lead wire 343' connects with the positive busbar Q, this lead wire 343' being intercepted by a normally open starting button 345 and the normally open contacts 346.

When the box to be strapped is properly positioned in the machine, the operator pushes the starting button 345, which commences the first period of the machine's cycle. When the starting button is closed, the solenoid J becomes energized, current passing from the busbar P through the winding of the solenoid J, hence through the normally closed contact fingers 334 and 335 on one of the shearing solenoids 112 and thence to the busbar Q. The energizing of the solenoid J closes the contacts 346 (whereby it becomes unnecessary for the operator to continue manually to hold the starting button) and also closes the contacts 347, which closes a circuit from the busbar P through the contacts 347, the solenoids 164, which controls the platform lift clutch 146, the normally closed contacts 348 on the solenoid L and the normally closed contacts 349 on the solenoid K and back to the busbar Q. (It might be here stated that the solenoid J remains energized throughout the complete cycle, its de-energizing being the last function of the controlling circuit at the end of the fourth period of the cycle). The platform is then lifted until the finger 168 closes the normally open contacts 169, which closes a circuit between the busbar P through the solenoid L and the normally closed contacts 350 and back to the busbar Q. This energizes the solenoid L, causing it to open the contact 348, which opens the circuit through the solenoid 164 which controls the platform lift clutch, stopping the lifting of the platform.

This terminates the first period of the cycle, the second period starting when the solenoid L closes the contacts 352, closing a circuit from the busbar Q through the contacts 352 and the crimping head motor F and back to the busbar P. When the sets of transverse shafts in the crimping heads E have been rotated through approximately 270°, the finger 278' of the crimping head timer closes the contact fingers 279 and 280, which establishes a circuit from the busbar Q through the contacts 279 and 280 and the solenoid M back to the busbar P. It will be remembered that the crimping head timer "coasts" through some 90° of additional rotation allowing its associated contact fingers to be opened. However, as soon as the solenoid M is energized, a shunt circuit through the contacts 353 is closed, so that the solenoid M is fed directly from the two busbars without passing through the contact fingers 279 and 280. The normally closed contacts 350 are also opened by the energizing of the solenoid M, which opens the circuit through the solenoid L. The second operation of the cycle is thus brought to a close.

The third period, which comprises the descent or the platform C, is commenced by the closing of a third pair of contacts 354, which are likewise controlled by the solenoid M. This closes a circuit from the busbar Q through the contacts 354, the solenoid K and the lower contacts 281, of the platform timer and back to the busbar P. This circuit, however, is not established until the platform has reached its lowest position, when the platform timer 168 closes the contacts 281. When the solenoid K is energized, the normally closed contacts 349 are opened, opening the circuit from the busbar Q through the contacts 349 and 348, the platform lift solenoid 164 and the contacts 347 and back to the busbar P. The descent of the platform is thus stopped at the proper time, terminating the third period of the cycle.

As before described, the fourth and last period of the cycle of operation comprises, first, the feeding of lengths of strapping into the wrapping mechanisms B, and second, the shearing of these lengths. The feeding of the strapping is commenced by the energizing of the solenoid K which closes a circuit from the busbar P through the contacts 360, adjacent the solenoid K, through the strap feed clutch solenoid 309 and the normally closed contacts 362 back to the busbar Q. The feeding of the strapping into the wrapping mechanisms is thus commenced. The contact fingers 325 and 326 of the strap feed timer are so mounted that at sometime during the revolution of the timing disc 322, the cam point 322' will close the fingers to establish a circuit from the busbar P, through the contact fingers 325 and 326 to, but not through, the contacts 363 and through the solenoid O back to the busbar Q. As soon as this circuit is closed, the solenoid O closes the shunt contacts 363, whereby a direct circuit is established from the busbar Q through the solenoid O and the contacts 363 back to the busbar P, rendering unnecessary a continued closure of the contact fingers 225 and 226 to keep the solenoid O energized. When the strap feed timer 332 has completed one revolution, the cam point 322' again closes the contacts 323 and 324, establishing a circuit from the busbar P through the contact fingers 323 and 324, solenoid N and the contacts 364 and back to the busbar Q. The contacts 364 are already closed by the energizing of the solenoid O. When the solenoid N is energized, the normally closed contacts 362 are opened, breaking the circuit from the busbar Q through the contacts 362, the strap feed clutch solenoid 309 and the contacts 360 and 347 and back to the busbar P, which throws out the strap feed clutch 304 and thus stops the feeding of more strapping into the raceways of the wrapping mechanisms.

The second operation of the fourth period of the cycle—the severing of the lengths of strapping by the shear bars 113—is started by the closing of the normally open contacts 365 by the solenoid N, whereby a circuit is established from the busbar P through the contacts 365 in parallel through the solenoids 112 and back to the busbar Q. The energizing of the solenoids 112, as previously explained, pulls the shear bars 113 upwardly sufficiently to sever the lengths of strapping fed into the raceways 64. When the core of one of the solenoids 112 is drawn upwardly to its upper position, its tail piece 336 opens the normally closed contacts 334 and 335 to break the circuit from the busbar Q through these contacts 335 and 334 and the solenoid J and back to the busbar P. The de-energizing of the solenoid J allows the contacts 346 to open, which entirely breaks any flow of current coming in through the lead wires 343 and 343'. Hence all six of the solenoids on the panel 340 are de-energized—if they have not previously been de-energized—which insures a return of all the contacts on the panel 340 to their normal position, at which time the electrical control is ready for a new cycle of operation whenever the operator presses the starting button 345.

Experience has shown that due to an occasional arcing of the contacts 365 controlled by the solenoid N, there is danger that the shear solenoids 112 may be energized sufficiently to partly raise the shear bars. This, of course, would result in a binding of the strap as it is fed toward the wrapping mechanism. To obviate this danger the contacts 328 and 329 are provided on the tail piece of the strap feed clutch solenoid 309, these contacts being inserted in the circuit of the shear solenoids 112. Hence, when the strap feed clutch is engaged to feed strapping into the race-way, the circuit of the shear bars is open, and the bars cannot catch the ends of the straps.

Adjustment for Box Sizes

The machine here shown is so constructed that if it is desired to vary either the height or the width, or both, of the boxes to be strapped, certain substitute parts of different proportions may be substituted for those shown, while certain other parts of the machine are capable of adjustment to adapt themselves to co-operate with these substitute parts to handle the different size of boxes.

It is to be understood that if a longer box of the same height and width is used, the crimping heads E and the wrapping mechanisms B below them may be spaced further apart, or, in case of extremely long boxes, more crimping heads E, wrapping mechanisms B and strap feed units I may be added. The toothed shaft 212 permits varying of the space between the crimping heads without interfering with the driving connections.

To be more specific, if the boxes to be strapped are higher and wider than those for which the machine is being used, the wrapping mechanisms B are changed by substituting longer stationary guide bars 63 to which are pivoted longer folding arms 65, and by moving the short guide bars 179 at the ends of the base bars 55 still further from the center of the mechanism. If need be, a longer base bar 55 may be provided. A longer set of cover strips 66 is also substituted in each wrapping mechanism.

The distance through which the platform C rises can remain constant, but the crimping heads must be raised so that the top of the box will be raised by the platform to the correct height relative to the height of the crimping heads. This is done by elevating the spaced supporting bars 205 upon which are mounted the crimping heads. The supporting bars 205 (Fig. 8) it will be remembered, are secured to a transverse bar 206 at each end of the machine, the ends of the transverse bars 206 being reciprocable upon the slide bars 123 on the corner posts 58 on the machine. The transverse bars 206 are held up by vertical screw shafts 366 which are spaced inwardly from each of the corner posts 58 and are threaded through the ends of the bars 206. The screw shafts 366 are supported at their lower ends by thrust bearings in brackets 367 secured to the inner faces of the corner posts 58 (Figs. 1, 6 and 8). The vertical screw shafts 366 project upwardly to the top of the frame of the machine, where they enter gear housings 368, within which they are provided with bevel gears 369 (Fig. 1). The cross shafts 370 extend transversely at each end of the machine between adjacent housings, the cross shafts 370 being provided with bevel pinions 371 meshing with the bevel gears 369. It is obvious by means of these cross shafts 370, the vertical screw shafts 366 at the front of the machine will be rotated in synchronism and that those at the rear of the machine will also be rotated in synchronism. In order to rotate both the front and the rear shafts in synchronism, a longitudinal shaft 372 extends from the left rear housing (Fig. 2), the front rear housing being provided with bevel pinions 373 which mesh with the bevel gears 369 within the housings 368. A hand wheel 374 is provided at the ends of the transverse shafts 370 whereby an operator standing at corner may rotate all of the vertical shafts 366 to raise or lower the crimping heads E to the desired elevation.

With the use of longer folding arms 65 which are pivoted farther apart, it becomes necessary to reposition the folding guide wings 76 on the under side of the crimping heads E, this preferably being done by substituting other clamping members 207 to support the pivot shafts 199 of the folding guide wings farther apart and provide a different curve for the stationary guides 79.

With the use of longer wrapping mechanisms B, it also becomes necessary to move the shear bars 113 on the strap feed units I outwardly farther from the center of the wrapping mechanisms. How this is done will next be explained. Referring to Figures 32, (Sheet 11) and 33 (Sheet 3), it will be seen that the frame of each strap feed unit I comprises a pair of vertical plates 283 which are held together by a plurality of bolts 375, but are transversely offset at the left to provide space for the supply spool 282. The top edges of the frame plates 283 are turned outwardly forming a T head 376, the lateral edges of which are beveled, as indicated at 376', to provide a slide for the strap feed carriage 377 which journals the forward end of the feed shaft 107 and supports the feed pressure lever 297, together with the associated feed rollers 108 and 109. To facilitate assembly, the carriage 377 is made in two parts which are clamped together, as by bolts 378. A rack bar 379 is secured between and below the halves of the carriage 377 and is engaged by a rack pinion 380 secured to an adjusting shaft 381 which is disposed parallel with the strap feed shaft 107 passing through the other strap feed unit I, where a similar rack pinion 380 is secured to it, and extends to the frame 301 at the rear of the machine. It is obvious that rotation of the adjusting shaft 381 will move the carriages 377 along the T heads 376 of the units I so that the points of severance of the strappings by the shear bars 113 may be positioned at the desired distance from the wrapping mechanisms.

Obviously, when the carriages 377 are moved along their associated units I, it becomes necessary also to move the rear (Fig. 2) end of the feed shaft 107 simultaneously. For this reason, the top of the frame 301 is provided with a T head 382 (Figs. 23, 24 and 26) providing a slideway for the carriage 300 in which is journaled the shaft 107. The carriage 300 is provided with a rack 383 which is engaged by a rack pinion 384 secured to the rear end of the adjusting shaft 381 between its journals in the T head 382 of the frame 301. The turning of the hand crank 385 at the end of the adjusting shaft 381 will cause the rack 383 to be reciprocated, carrying with it the carriage 300, through which is free to pass the worm shaft 303. In this way, by simply turning the hand crank 385, an operator may quickly adjust the position of the shear bars 133 on the units I relative to the wrapping mechanisms. The carriage 300 is then locked by set screws 300'.

With the use of a larger box, it, of course, becomes necessary to feed a longer length of strapping into the raceway 64. This adjustment is made, as before suggested, by the substitution (Fig. 31) of a smaller size of intermediate gear 316 in the strapping feed timer so that the worm shaft 303 may rotate a larger number of times for each revolution of the timing disc 322.

From the foregoing, it will be seen that several different sizes of boxes may be strapped by the machine by the substitution of a relatively few number of new parts and a simple adjustment of the machine to adapt itself to these new parts, all of which changes may be made in a short time.

While but one particular embodiment of the invention has been described, it is to be understood, of course, that many alternative expedients may be adopted and many departures made from the construction and means here illustrated without departing from the scope and spirit of the invention.

I claim:

1. A device for enwrapping a box with a ribbon-like strap, said device comprising a raceway into which a strap may be fed longitudinally, certain sections of said raceway being movable relative to other sections to wrap said strap about a plurality of sides of said box, the sides of said raceway being inwardly inclined to overhang the bottom thereof, but permitting said strap to be passed out of said raceway between the said inclined sides.

2. A wrapping mechanism for placing a strap about a plurality of sides of a box, said mechanism comprising a plurality of aligned sections forming a raceway, means for feeding a strap into said raceway, certain of said sections being pivoted relatively to the others, and releasable jaws at the free ends of said pivoted sections for holding the strap in said raceway.

3. A wrapping mechanism for folding a binder about a plurality of sides of a box, said mechanism comprising a fixed member and a pair of binder folding arms having spaced pivots thereon, said arms being adapted to receive said binder, and clamping means at the free ends of said arms for holding said binder on said arms during the folding thereof.

4. A device for placing a binder about a plurality of sides of a box, said device comprising a plurality of pivoted arms, said arms when in aligned position, being adapted to receive a binder, jaws at the free ends of said arms for grasping said binder, and means for opening said jaws when said arms are in said aligned position to permit the insertion of said binder.

5. A device for wrapping a binder about a plurality of sides of a box, which device comprises a raceway adapted to receive a binder, said raceway comprising a fixed section and a pair of binder folding sections pivoted at the ends of said fixed section, clamping means at the free ends of said folding sections for grasping said binder when said folding sections are swung about their pivots, and means for releasing said clamping means when said folding sections are swung into a binder receiving position.

6. A device for wrapping a length of ribbon-like strap around a plurality of sides of a box, said device comprising a fixed raceway section, a swinging raceway section pivoted at each end of said fixed section, said sections when in aligned relation constituting a continuous raceway into which said strap may be fed, means at the free ends of said swinging sections for clamping said strap, the ends of said strap projecting freely beyond said clamping means, said clamping means serving to prevent said strap, when the ends thereof are set in vibration, from coming out of said swinging raceway sections.

7. A device for wrapping a length of ribbon-like strap around a plurality of sides of a box, said device comprising a fixed raceway section, a swinging raceway section pivoted at each end of said fixed section, said sections when in aligned relation constituting a continuous raceway into which said strap may be fed, and means at the free ends of said swinging sections for clamping said strap, the ends of said strap projecting freely beyond said clamping means, said clamping means serving to prevent said strap, when the ends thereof are set in vibration, from coming out of said swinging raceway sections, said clamping means yielding under pressure to permit said strap to be pulled transversely from said sections.

8. A device for wrapping a length of ribbon-like strap around a plurality of sides of a box, said device comprising a fixed raceway section, a swinging raceway section pivoted at each end of said fixed section, said sections when in aligned relation constituting a continuous raceway into which said strap may be fed, means at the free ends of said swinging sections for clamping said strap, the ends of said strap projecting freely beyond said clamping means, said clamping means serving to prevent said strap, when the ends thereof are set in vibration, from coming out of said swinging raceway sections, and means to open said clamping means when said sections are in said aligned position for permitting the longitudinal insertion of said strap.

9. In combination with a device for wrapping a ribbon-like strap about a plurality of sides of a box, an arm provided with a longitudinal open groove adapted to receive said strap, means for moving said arm to fold said strap over one side of said box, one end of said strap extending freely beyond the end of said arm, and clamping means adjacent the end of said arm for grasping said strap whereby vibration of the free end of said strap is prevented from carrying said strap out of said groove, said clamping means yielding under force to permit said strap to be pulled out from said open groove.

10. In combination with a device for wrapping a ribbon-like strap about a plurality of sides of a box, an arm pivotally mounted on said device and provided with a longitudinal groove adapted to receive said strap, a jaw member pivoted on the free end of said arm, spring means for urging said jaw member into clamping engagement with said strap, said jaw member, when said arm is in its strap receiving position, being engaged by said device to release said clamping engagement.

11. A device for wrapping a ribbon-like strap about a plurality of sides of a box, said device comprising an open sided raceway, means for pushing said strap in an endwise manner into said raceway with a flat side of said strap facing the open side of said raceway, means overlying said open side to prevent said strap from passing outwardly therethrough during such pushing, and means for removing said overlying means to permit said strap to be carried out of said raceway through said open side.

12. A device for wrapping a ribbon-like strap about a plurality of sides of a box, said device comprising relatively moving members provided with grooves having open top sides, said grooves, when said members are in alignment, constituting a raceway into which said strap may be fed longitudinally with one of its flat sides adjacent the bottom side of said grooves, a strip overhanging the open side of said raceway to prevent said strap from passing out of said raceway through said open side, and means to remove said strip when said members are moved out of such alignment and permit said strap to be withdrawn from said grooves through said open sides.

13. A device for wrapping a length of ribbon-like strap about a plurality of sides of a box, said device comprising a frame, a platform, means for elevating said platform relatively to said frame, arms pivotally mounted on said platform, open grooves on said arms which when in alignment constitute a strap receiving raceway into which said strap may be pushed in an endwise manner, a strip mounted on said frame and adapted to overlie the open side of said raceway to prevent said strap from buckling out of said raceway through the open side thereof during such pushing, strap receiving means adjacent the top side of said box, means for swinging said arms during the elevating of said platform to deliver said strap to said receiving means, and means for moving said strip away from the open side of said raceway when said platform starts to elevate.

14. A device for wrapping a length of ribbon-like strap about a plurality of sides of a box, said device comprising a frame, a platform, means for elevating said platform relatively to said frame, arms pivotally mounted on said platform, open grooves on said arms which when in alignment constitute a strap receiving raceway into which said strap may be pushed in an endwise manner, a strip mounted on said frame to move transversely of said raceway, said strip extending longitudinally of said raceway and adapted to overlie the open side thereof, strap receiving means adjacent the top side of said box, means for swinging said arms during the elevating of said platform to deliver said strap to said receiving means, means tending to move said strip away from said open side, and means for holding said strip over said open side while said platform is in its lower position.

15. A mechanism for positioning a binder about a box, comprising guideway means of channel cross section said guideway means having folded and extended positions, said guideway being adapted to receive said binder in an endwise manner when said guideway means is in said extended position, and means operative at that time for confining said binder to longitudinal movement along said guideway, said confining means being rendered inoperative when said guideway is in its said folded position, allowing said binder to be withdrawn.

16. A mechanism for folding a strap about a box, comprising means forming a guideway into which said strap is pushed longitudinally, said guideway having a stationary midportion for positioning said strap at one side of the box and swinging end portions for positioning said strap on two other sides of the box, a longitudinal strip having an inturned flange for confining said strap to said guideway when the latter is in its unfolded position, and means for rendering said flange nonconfining when said guideway is in its folded position whereby said strap may be lifted from said guideway.

17. A device for bringing an end of a binder about a box corner, said device comprising means for swinging said binder end through an angle, a member provided with a guideway for directing said binder end in an endwise manner through a turn, and means for bringing said member, subsequently to said swinging, behind and transversely toward said binder end to introduce said end substantially tangentially into said guideway.

18. A device for placing a length of binder about a box corner, said device comprising in combination means for engaging said binder, a guideway for leading said binder in an endwise manner to said engaging means, means, beyond which an end of said binder projects, for swinging said binder end toward said guideway at a substantial angle thereto, and a wing member for swinging behind said free end to guide said binder into said guideway in an endwise manner.

19. A device for placing a length of binder about a box corner, said device comprising clamping means for engaging said binder, a guideway on said device for leading said binder in an endwise manner to said clamping means, means adapted to grasp said binder a distance from one end thereof for swinging said binder around said corner and toward said guideway, and a wing member for swinging behind said swinging binder end to guide it into said guideway in an endwise manner.

20. A device for placing a length of binder about a box, said device comprising in combination, means for supporting said binder at the bottom side of said box, with an end of said binder extending beyond said box, means for folding said extending end upwardly adjacent a lateral side of said box, and means adjacent the top of said box for receiving said binder end in an endwise manner, said receiving means comprising a wing guide member adapted to swing behind said binder end after the latter has been swung by said folding means.

21. A device for placing a length of binder about a box, said device comprising a frame, a platform vertically reciprocable thereon, means for elevating said platform relatively to said frame, means on said platform for supporting said binder at the bottom side of said box with an end of said binder extending beyond said box, means mounted on said platform for folding said extending end upwardly adjacent a lateral side of said box, means mounted on said frame for receiving said binder end in an endwise manner, said receiving means comprising a wing member adapted to swing behind said binder end after the latter has been swung by said folding means, actuating means for swinging said wing member, and means on said platform for engaging said actuating means when said platform is elevated.

22. A device for placing a length of binder about a box, said device comprising means for swinging an end of said binder through an angle to bend said binder about a corner of said box, and a wing member provided with a guideway for leading said binder end with a guideway for leading said binder end in an endwise manner into a second bend about a second corner of said box, and means for swinging said wing member behind said swinging binder end to introduce said binder end substantially tangentially thereinto in an endwise manner.

23. A device for wrapping a binder tightly about a box, said device comprising means for supporting a length of binder across the bottom side of said box with the ends of said binder projecting beyond said box, arms pivoted on said support for folding said ends upwardly along the lateral sides of said box, the ends of said strap extending freely beyond said arms, stretching jaws at the top side of said box, members having guideways for leading said binder ends in an endwise manner around turns and to said jaws, and means for pushing said binder longitudinally along said guideways, said members being pivoted on said device to swing behind said swinging binder ends to introduce said binder ends substantially tangentially into said guideways.

24. A device for wrapping a binder tightly about a box, said device comprising means for supporting a length of binder across the bottom side of said box with the ends of said binder projecting beyond said box, arms pivoted on said support for folding said ends upwardly along the lateral sides of said box, stretching jaws at the top side of said box, members having guideways for leading said binder ends in an endwise manner around turns and to said jaws, means for pushing said binder longitudinally along said guideways, said binder ends swinging through the binder guiding position of said members, means for removing said members from such position during such swinging, and means for subsequently returning said member to such position.

25. In a machine for securing together the ends of a binder, the combination of means for fastening said binder ends together, a frame for supporting said fastening means, stretching jaws for grasping said binder ends and pulling them into position for such fastening, means for pivotally supporting said stretching jaws on said frame, and means for swinging said jaws away from said strap ends after they have been secured together by said fastening means.

26. In a machine for providing a box with a binder, the combination of means for fastening the ends of said binder, a frame for supporting said fastening means at one side of the box, stretching jaws for grasping said binder ends and pulling them into position for such fastening, means for placing said binder about the box and for introducing said binder ends into said jaws, means for pivotally supporting said stretching jaws on said frame, means for swinging said jaws away from between said binder and the box to permit the box to be removed, and means on said frame to prevent said binder from swinging with said jaws relatively to said frame.

27. The combination with means to fasten together the ends of a box encircling ribbon-like strap, of a frame for said fastening means, jaws for engaging the under and top sides of said strap to pull the ends of said strap together adjacent said fastening means, and means for moving said jaws away from beneath said strap laterally thereof, whereby said box may be moved downwardly from said fastening means.

28. A machine for fastening together the ends of a box encircling binder, said machine comprising a frame, binder fastening means supported on said frame, stretching jaws adapted to grasp said binder at distances from the ends thereof for pushing said binder ends together adjacent said fastening means, means for moving said jaws together relatively to said frame, and means on said frame to guide said binder ends endwise, as they are thus pushed, into position to be engaged by said fastening means, said guide means including a laterally moving portion for embracing the upwardly extending strap ends.

29. The combination of a frame, means on said frame for supporting a pair of overlapped binders, jaws for fastening a girth about said binders, said jaws being reciprocably mounted on said frame to move between distant and adjacent positions relative to said binders, means for feeding an end of a continuous girth into said jaws when the latter are in said distant position, said jaws being adapted to carry said severed girth end to said binders in moving to said adjacent position, a fixed shearing edge on said frame and a movable shearing edge on said jaws, which edges co-operate to sever said girth end in the reciprocation of said jaws.

30. The combination of a frame, means on said frame for supporting a pair of overlapped binders, jaws for fastening a girth about said binders, said jaws being reciprocably mounted on said frame to move between distant and adjacent positions relative to said binders, means for feeding an end of a continuous girth into said jaws when the latter are in said distant position, said jaws being adapted to carry said severed girth end to said binders in moving to said adjacent position, and means actuated by the reciprocation of said jaws to sever said girth end.

31. The combination of a frame, means on said frame for supporting a pair of overlapped binders, a carriage movably mounted on said frame, a pair of jaws on said carriage adapted to crimp said overlapped binders together with a length of girth into a tension resisting deformation, co-operating shear members on said frame and on said carriage respectively, means for leading a continuous girth between said shear members and for delivering an end thereof to said jaws, and means for moving said carriage to bring said jaws to said binders and to sever said girth end.

32. The combination of a frame, means on said frame to support a pair of binder ends, a carriage reciprocably mounted on said frame, jaws on said carriage for receiving a girth, means extending to said jaws for delivering a girth into said jaws, guide means on said carriage for supporting said jaws to permit sliding of said jaws toward each other transversely to the direction of such delivering, means for moving said carriage to carry said jaws and said girth to said binder ends, means for subsequently moving said jaws together to fasten said girth about said binder ends, and means for returning said carriage to carry said jaws to said delivering means, said guide means being cut away opposite said delivering means to permit said carriage to be reciprocated.

33. The combination of a frame, means on said frame for supporting a pair of binders, a carriage movably mounted on said frame, jaws on said carriage for crimping said binders together with a girth therefor into a tension resisting deformation, means for moving said carriage relatively to said frame to carry said jaws to said binders, a pair of die members on said frame and on said carriage respectively, means for feeding a girth blank between said die members, said die members engaging said blank to pre-form such a girth during said movement of said carriage, and means for delivering said preformed girth to said binders.

34. The combination of a frame, means thereon for supporting a pair of binder ends, a carriage movably mounted on said frame, a pair of jaws carried on said carriage, means for moving said carriage to carry said jaws to said binder ends, means on said carriage for forcing said jaws together to crimp said binder ends into a tension resisting deformation, a pair of toggle links, one of which is pivoted to said frame and the other to said forcing means, and means engaging one of said toggles for actuating said forcing means.

35. In a box binding machine, the combination of a frame, a spool having a circular periphery, a length of binder wound on said spool, a roller on said frame for supporting the periphery of said spool at one side of the axis thereof, an arm pivoted on said frame, a second roller on said arm for supporting the periphery of said spool at the other side of said axis, means to lower said arm to permit said spool to be rolled away from said frame, and means for withdrawing said binder from said spool.

36. In a box binding machine, the combination of a frame, a wrapping mechanism mounted on said frame for placing a length of binder about a box, means on said frame for centering said box relatively to said wrapping mechanism, a raceway on said wrapping mechanism, a carriage on said frame at one end of said raceway, means on said carriage for feeding the end of a continuous binder into said raceway, and means on said carriage between said feed means and said raceway for severing a length from said binder, said carriage being reciprocable on said frame to move said severing means relatively to said centering means whereby said wrapping mechanism may use different lengths of binder.

37. The combination of jaws for crimping a length of girth about a pair of strap ends, means for positioning an end of a continuous girth within said jaws, and means for subsequently severing said end from said continuous girth.

38. The combination of jaws for simultaneously crimping a pair of overlapped strap ends and a girth therefor into a tension resisting deformation, means for feeding an end of a continuous girth into said jaws, and means for subsequently severing said end from said continuous girth.

39. In a box binding machine, the combination of a frame, a wrapping mechanism mounted on said frame for placing a length of binder about a box, said mechanism comprising a raceway, a carriage reciprocably mounted on said frame at one end of said raceway, a feed wheel journaled on said carriage for feeding the end of a continuous binder into said raceway, and means on said frame for driving said wheel.

40. In a box binding machine, the combination of a frame, a wrapping mechanism on said frame for placing a length of binder about a box, said mechanism comprising a fixed member at one side of said box and arms pivoted at the ends of said member to place the binder along the adjacent sides of the box, means on said mechanism constituting a binder receiving raceway, means for feeding an end of a continuous binder into said raceway, means on said carriage for severing the end of said binder, and a carriage upon which said severing means is mounted, said carriage being reciprocably mounted on said frame at the end of said raceway for moving said severing means toward and away from said fixed member.

In witness whereof, I hereunto subscribe my name this 4th day of Aug., 1926.

SIDNEY W. TREAT.